(12) United States Patent
Rediniotis et al.

(10) Patent No.: US 7,010,970 B2
(45) Date of Patent: Mar. 14, 2006

(54) EMBEDDED-SENSOR MULTI-HOLE PROBES

(76) Inventors: Othon K. Rediniotis, 1005 Falcon Cir., College Station, TX (US) 77845; Richard D. Allen, 2992 Thurman Rd., Bryan, TX (US) 77808

( * ) Notice: Subject to any disclaimer, the term of this patent is extended or adjusted under 35 U.S.C. 154(b) by 75 days.

(21) Appl. No.: 10/040,751

(22) Filed: Jan. 8, 2002

(65) Prior Publication Data

US 2002/0121135 A1 Sep. 5, 2002

Related U.S. Application Data

(60) Provisional application No. 60/260,955, filed on Jan. 12, 2001.

(51) Int. Cl.
*G01F 13/00* (2006.01)
(52) U.S. Cl. .................. 73/170.11; 73/861.65
(58) Field of Classification Search .................. 73/170, 73/180, 862.04, 189, 182, 716, 178 H, 170.05–170.15, 73/861.65–861.68; 324/754–755; 600/399, 600/500; 702/124

See application file for complete search history.

(56) References Cited

U.S. PATENT DOCUMENTS

| | | | | |
|---|---|---|---|---|
| 3,677,079 A | * | 7/1972 | Hoeflinger | 73/861.65 |
| 3,699,811 A | * | 10/1972 | Maiden et al. | 73/147 |
| 4,745,812 A | * | 5/1988 | Amazeen et al. | 338/47 |
| 4,833,917 A | * | 5/1989 | Wilson | 73/170.02 |
| 5,117,687 A | * | 6/1992 | Gerardi | 73/170.15 |
| 5,423,209 A | * | 6/1995 | Nakaya et al. | 73/182 |
| 5,852,236 A | * | 12/1998 | Honda | 73/170.15 |

* cited by examiner

*Primary Examiner*—Max Noori
*Assistant Examiner*—Alandra Ellington
(74) *Attorney, Agent, or Firm*—James W. Hiney

(57) ABSTRACT

A high-performance, fast-response, multi-sensor pressure probe for velocity and pressure measurement applications in unsteady and turbulent flowfields. The invention includes both 5 and 7-sensor probes, hemispherical-tip probes and conical-tip probes of various diameters. The present invention eliminates the need for long pressure tubing in such probes by placing the sensors adjacent the flow apertures which leads to a dramatic response in probe measurement frequency response which extends the use of the invention to unsteady and turbulent flows.

12 Claims, 38 Drawing Sheets

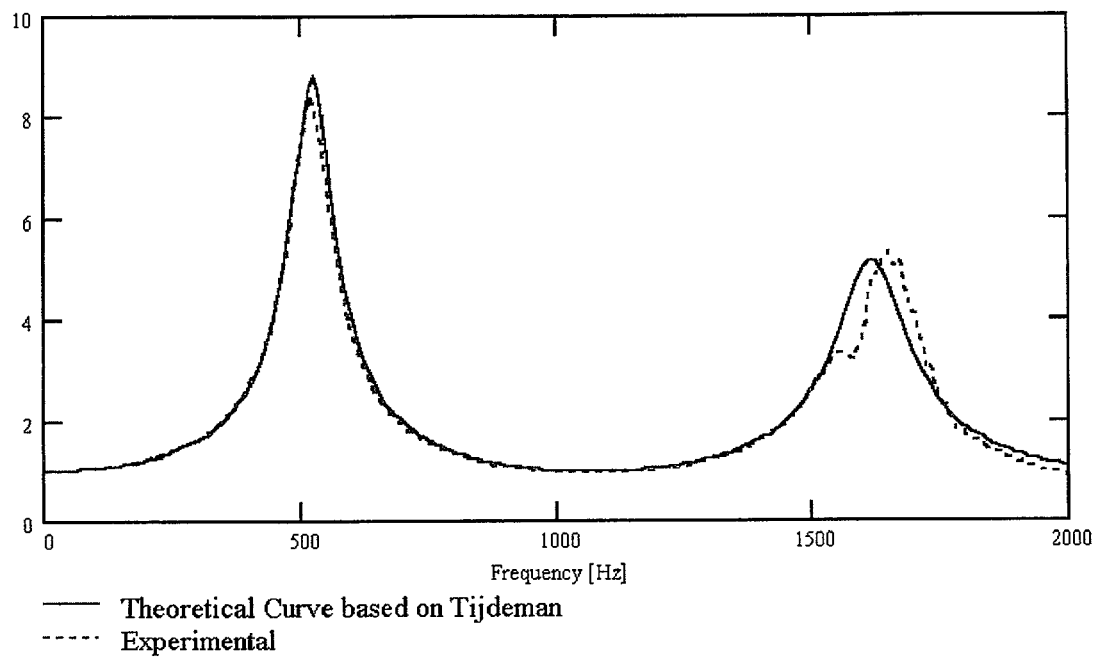
FIG 29
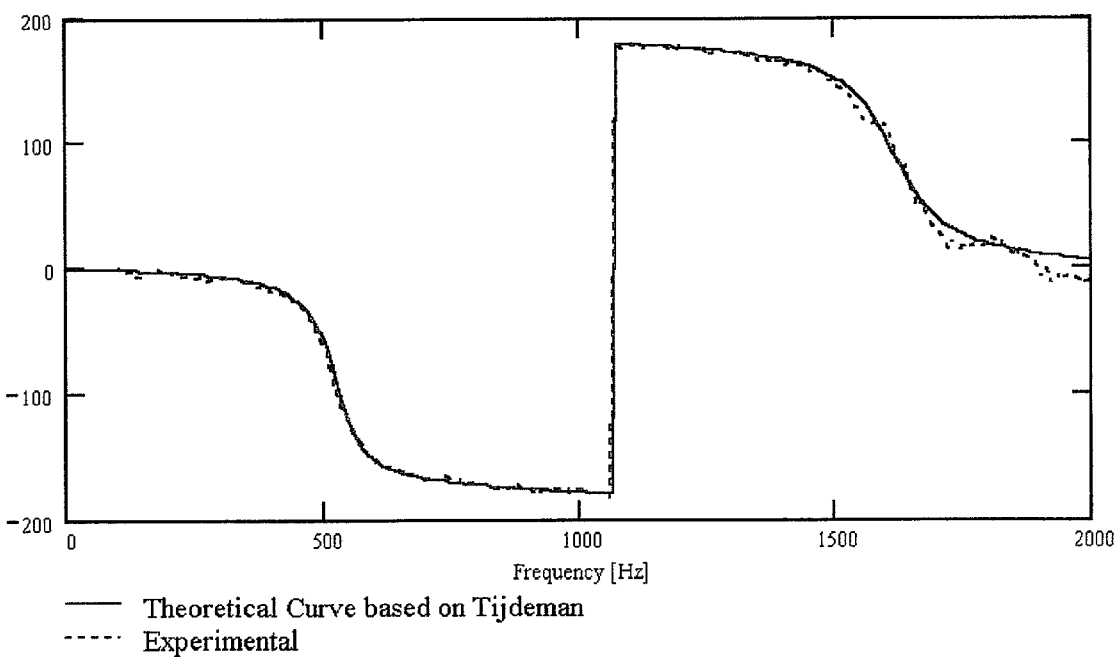

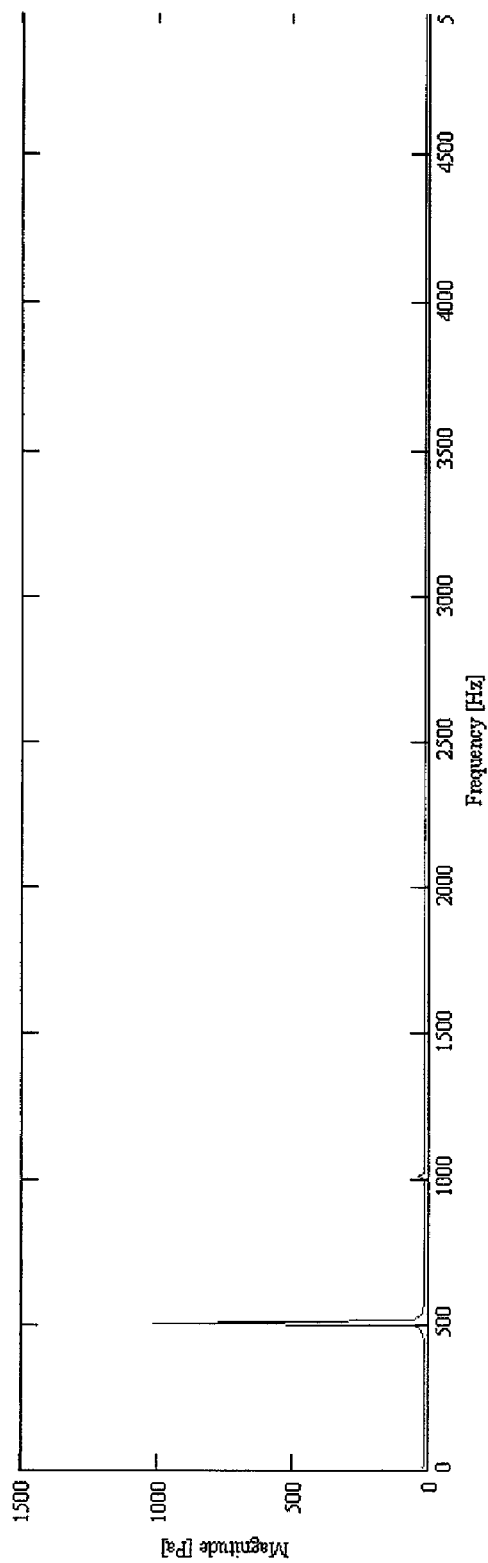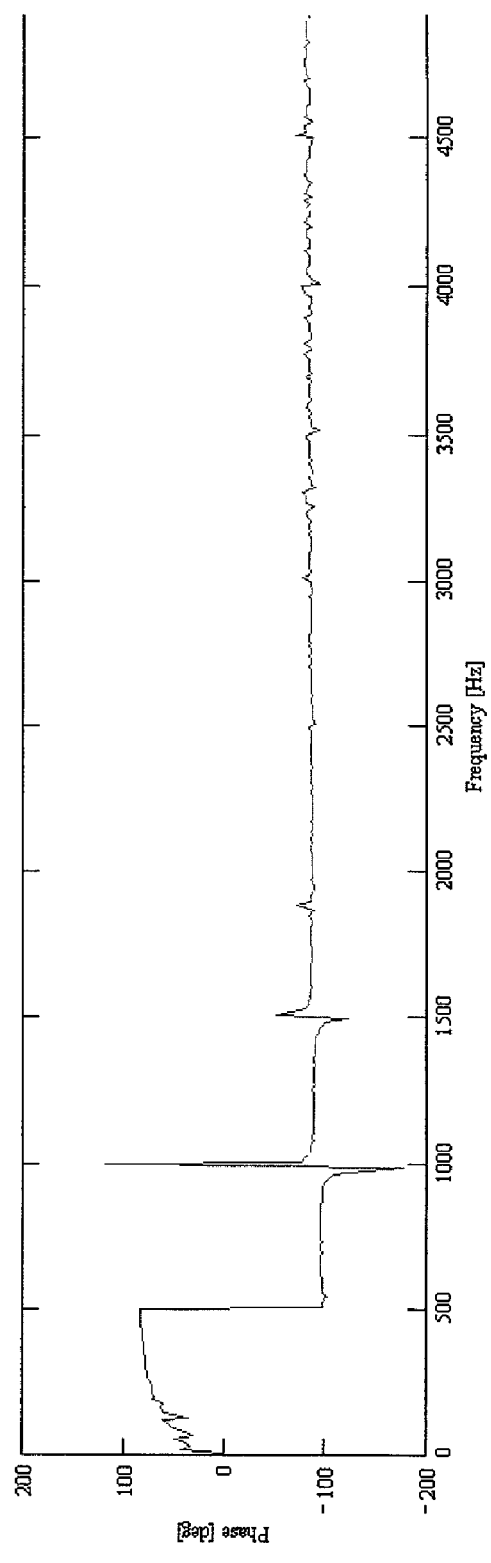
FIG. 31

EMBEDDED-SENSOR MULTI-HOLE PROBES

This invention relates to a high-performance, fast-response, multi-sensor pressure probes for velocity and pressure measurement applications in unsteady and turbulent flowfields. It relies on provisional patent application Ser. No. 60/260,955 filed on Jan. 12, 2001 by Telionus and Rediniotis and incorporates it by reference herein.

THE HISTORY OF THE FIELD

In the past, 5-sensor and 7-sensor, hemispherical-tip and conical-tip probes, of various diameters, have been developed. The present technology eliminates the use of long pressure tubing tubing in conventional 5 and 7 sensor probes by incorporating the pressure sensing transducers close to the probe tip. This, in turn, results in a dramatic increase of the probe measurement frequency response, extending its use to unsteady and turbulent flows. Although the probes developed so far are at least 1.6 mm in diameter, the technology developed in this invention can easily be applied towards the development of smaller probes, by embedding MEMS (Micro-Electro-Mechanical Systems)-based pressure sensors at the probe tip. Such small pressure sensors can even be incorporated into a conventional omni-directional 18-hole probe, thus resulting in an instrument not only of high frequency response but also omni-directional velocity measurement capabilities. High-accuracy calibration techniques have also been developed to translate the 5 or 7 measured probe pressures to the corresponding three components of velocity and the static and dynamic pressures at the point of measurement. This invention is expected to produce a new type of flow-diagnostics probes that are anticipated to prove invaluable to the fluid mechanics community. They will be significantly more rugged than hot-wires and much less dependant on repetitive and tedious calibration, provide much larger measurable flow angularity, match or exceed a hot-wire's spatial resolution capabilities and compete with a hot-wire's frequency response.

THE PRIOR ART

Multi-hole pressure probes, such as 5 hole and 7 hole probes, have in many cases provided the easiest-to-use and most cost-effective method for steady state, three component flow velocity and pressure measurements in research and industry environments. In high-productive environments, non-intrusive flow measurements techniques such as Laser-Doppler Velocimetry (LDV) and Particle Image Velocimetry (PIV), although powerful, have been traditionally avoided, since they require painstaking efforts toward their successful usage. Costly components, complex setups, troublesome flow "seeding" requirements, lack of flexibility, ruggedness and mobility and ease of misalignment often render such techniques impractical. For steady-state measurements, multi-hole probes are often favored even over Hot-Wire Anemometry, due to the susceptibility of the latter to frequent wire damage and the need for repetitive calibration.

Even after the measurement capabilities of multi-hole probes were expanded in recent years, however, in terms of the maximum measurable flow angularity and frequency response, the current state-of-the-art of such probes is plagued by the following limitation. Conventional multi-hole probes communicate through the pressures (5 or 7) at the ports of the probe tip, to the pressure transducers through long pressure tubing. Especially in wind-tunnel measurements, the use of tubing several feet long is typical. As a result, in an unsteady flowfield, where the pressures at the probe tip are changing rapidly, the pressures measured by the transducers have a phase lag with respect to the true pressures at the tip, and their magnitudes are attenuated. The faster the change of the flow (and therefore the tip pressures) the larger the discrepancy between the transducer pressures and the tip pressures, and, hence, the largest the error in the measurement. This is one reason why conventional multi-hole probes have only been used for steady-state measurements, i.e., for measurements in flows that are not changing over time or are changing very slowly. Such probes therefore have a measurement frequency response that does not exceed a few Hertz. The longer the pressure tubing, the lower their frequency response.

The second limitation of the previous state-of-the-art relates to the fluid mechanics around the probe tip in unsteady flows. Although multi-hole probes calibration techniques for steady-state measurements are well established today (Gallington, 1980, Kjelgaard, 1988, Zilliac, 1993, Houtman and Bannink, 1989, Everett et al., 1993, Rediniotis et al, 1993, Rediniotis and Chrysanthakopoulos, 1995), largely unresolved issues persisted pertaining to the calibration of such instruments for measurement in unsteady and turbulent flows. Siddon (1969), Gossweiler et al (1994), Humm et al (1994), used pressure probes in unsteady flow and examined the error introduced if steady-state probe calibration is used in unsteady flow environments. Several error sources were identified, the most important of which are: inertial or apparent mass effects (potential flow) effects, dynamic boundary layer effects, dynamic stall effects and vortex shedding effects. For example, for a flow oscillation frequency of 5.9 kHz., and depending on probe geometry and size (in Humm et al two probe tip sizes were tested, 4 mm. and 8 mm.), errors as high as 100% were identified. The highest errors were observed for wedge-type probe geometries, while circular probe tip geometries were found to reduce these errors. Another important result in Humm et al. was the fact that for circular tip geometries the main two sources of errors were inertial? (potential flow) effects and spatial velocity gradient effects. Viscosity and circulation related errors were much smaller. Until now, there has been no successful way to account for these effects. Therefore, even if the pressure transducers were embedded close to the probe tip and the pressure tubing was eliminated or minimized the prior state-of-the-art could not take advantage of the high frequency response of the transducers, because it could not successfully account for unsteady flow inertial effects.

The invention presented herein over comes both of these limitations discussed above by embedding the pressure transducers at or near the probe tip, thus eliminating or minimizing the pressure tubing from the tip to the transducers and by successfully accounting for the flow inertial effects. The availability, in the market, of miniature pressure transducers has allowed them to be embedded at or near the tip without significantly increasing the probe tip dimensions. Keeping the probe tip diameter small is important in terms of spatial resolution of the measurements, i.e., the ability of the probe to distinguish flow changes spatially.

Attention is directed to U.S. Pat. No. 5,423,209, which shows a truncated pyramid shape multi-hole Pitot probe and flight Velocity Detection System. The instrument shown and described looks similar but is distinct in operation. The probe nose is designed in the shape of a pyramid but more holes are required, makes the tip larger and requires a much larger number of pressure sensors. Such a probe would not function in the laboratory which must have a small a tip as possible in relation to the flow it is measuring.

U.S. Pat. No. 3,699,811 shows a multi-hole velocity instrument which may look similar to the instant invention but requires a servomotor control to align the tip with the free stream before measurements can be obtained. This procedure further increases the time required to obtain just one measurement since one has to wait for the motors to turn the probe and search for a reading that confirms the fact that the probe is aligned with the air stream.

The probe shown in U.S. Pat. No. 5,406,839 attempts to circumvent limitations in the range of conventional pressure sensing systems by including flow meters. Today's pressure sensors have a much wider range and the flow metering devices are very slow and limit further the ability of this instrument to record wind speeds that change fast over time.

U.S. Pat. No. 5,466,067 shows a bulky probe which is cumbersome to use in a laboratory setting as it is designed for use on an aircraft. U.S. Pat. No. 5,396,524 shows a very specialized probe to measure flow in the pipes of nuclear reactors. It is very slow and does not return the direction of the flow.

The probe shown in U.S. Pat. No. 5,412,983 shows a very simple probe which compares the flow entering and exiting in a chamber through two holes of different sizes. Its overall dimensions are therefore controlled by the geometry of the chambers and its frequency response's severely limited.

U.S. Pat. No. 5,117,687 shows an instrument using strain gauges to measure forces exerted on a sphere and then converts this information to air speed and direction. This is a very bulky instrument and could interfere with the flow it is attempting to measure. It is not appropriate for a laboratory.

The probe shown in U.S. Pat. No. 4,833,917 measures five pressures along pressure holes with different orientations with respect to the oncoming wind. However, its tip is shaped like a circular cylinder and is therefore interfering with the flow stream it is measuring. U.S. Pat. No. 4,388,691 shows a velocity pressure measuring device which has a cylinder for a tip which is supposed to be placed normal to the direction of the wind. The problem is in knowing the direction of the wind which constantly changes.

OBJECTS OF THE INVENTION

Accordingly it is an object of this invention to provide an improved high-performance, fast-response, multi-sensor pressure probe, and It is a further object of this invention to provide am improved multi-sensor probe for velocity and pressure measurement applications in unsteady and turbulent flowfields, and It is a still further object of this invention to provide am improved high-performance, quick response pressure probe which eliminates the need for long pressure tubing, and An additional object of this invention is to provide an improved omni-directional 18-hole probe, and A still further additional object of this invention is to an improved pressure probe which are less dependant on repetitive and tedious calibration than existing pressure probes, and Another object of this invention is to provide an improved pressure probe which does not have a phase lag between the reading of the pressure at the probe tip and the transducer reading, and Still another object of this invention is to provide an improved pressure probe which tends to eliminate inertial mass effect, dynamic boundary layer effects, dynamic stall effects and vortex shedding effects.

Having described the invention in general terms and the objects of the invention, attention is directed to the drawings in which:

FIG. 28 shows a schematic of a basic tubing-transducer system.

FIG. 29 shows the plot of the gain and phase angle curves for a six inch long tube.

FIG. 31 shows plots of the FFT modulus and argument of the time trace of FIG. 3.

DETAILED DESCRIPTION OF THE INVENTION AND EMBODIMENTS

Figure 1:
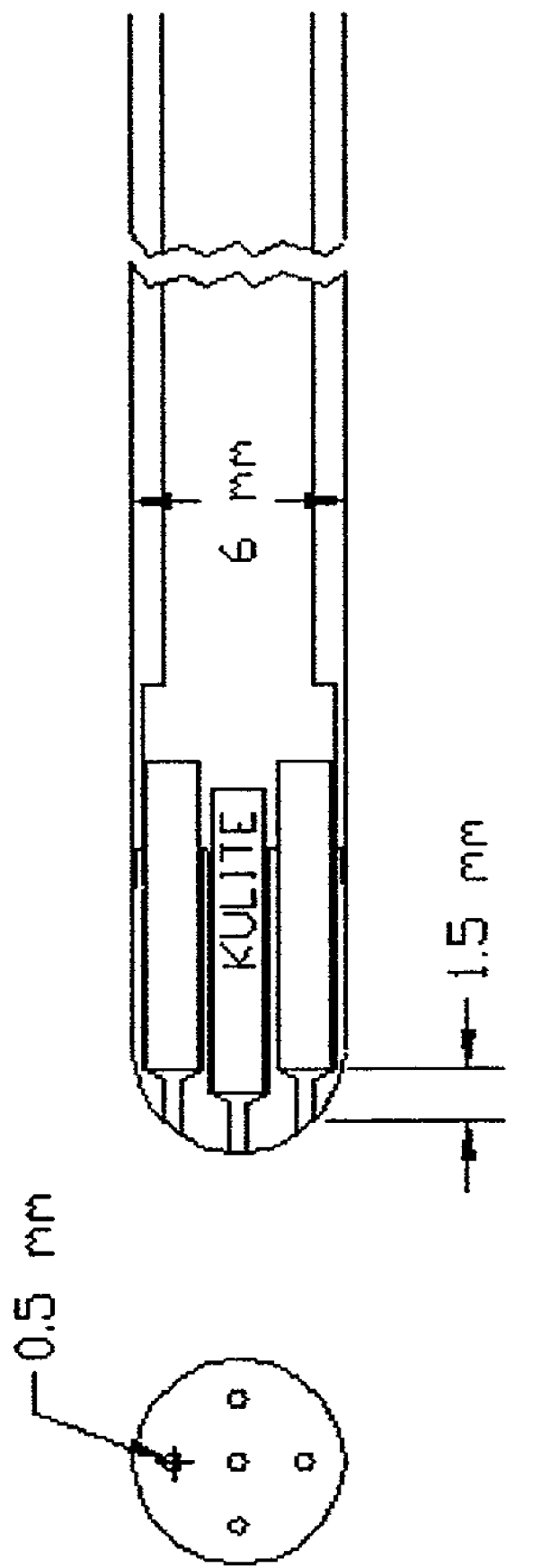
FIG. 1 is a cross-section of a 5-hole probe with 5 embedded miniature pressure transducers.

Having generally described the invention, its objects and its operation, attention is directed to the drawings and the accompany description of the detailed operation of the invention and its embodiments. There are several embodiments of the invention depending on the geometry of the probe, the number of pressure ports/holes at the probe tip, the type and size of the pressure transducers and their proximity to the probe tip.

Referring to FIG. 1 there is shown a typical example of the embodiment for a large 5 or 7-hole probe with miniature pressure transducers embedded at the probe tip. The embodiment, noted as 1, uses a commercially available miniature Kulite XCS-062 pressure sensors. The Kulite XCS-062 is a differential pressure transducer using a fully active Wheatstone bridge on a silicone membrane. The sensors have a high frequency response (50 kHz) and can come in a variety of pressure ranges (the transducers shown in FIG. 1 have a pressure range of plus or minus 5 psig). Each individual sensor has an outer diameter of 0.064". FIG. 1 shows the miniature pressure sensors noted as 2, 3 are located near the tip of the probe to minimize the channel length and thus the time lag induced by the volume from the probe surface to the sensor diaphragm, as well as moving the Helmholtz resonance frequency well above the transducer frequency response. The five Kulite pressure sensors, noted as 2, 3, 4, 5 and 6, are calibrated individually. A typical embedded-sensor probe is calibrated in both steady and unsteady flow environments and its prediction is evaluated. The calibration theory and necessary facilities are described in a later section. This design can produce a range of probes to suit several applications.

Figure 2:
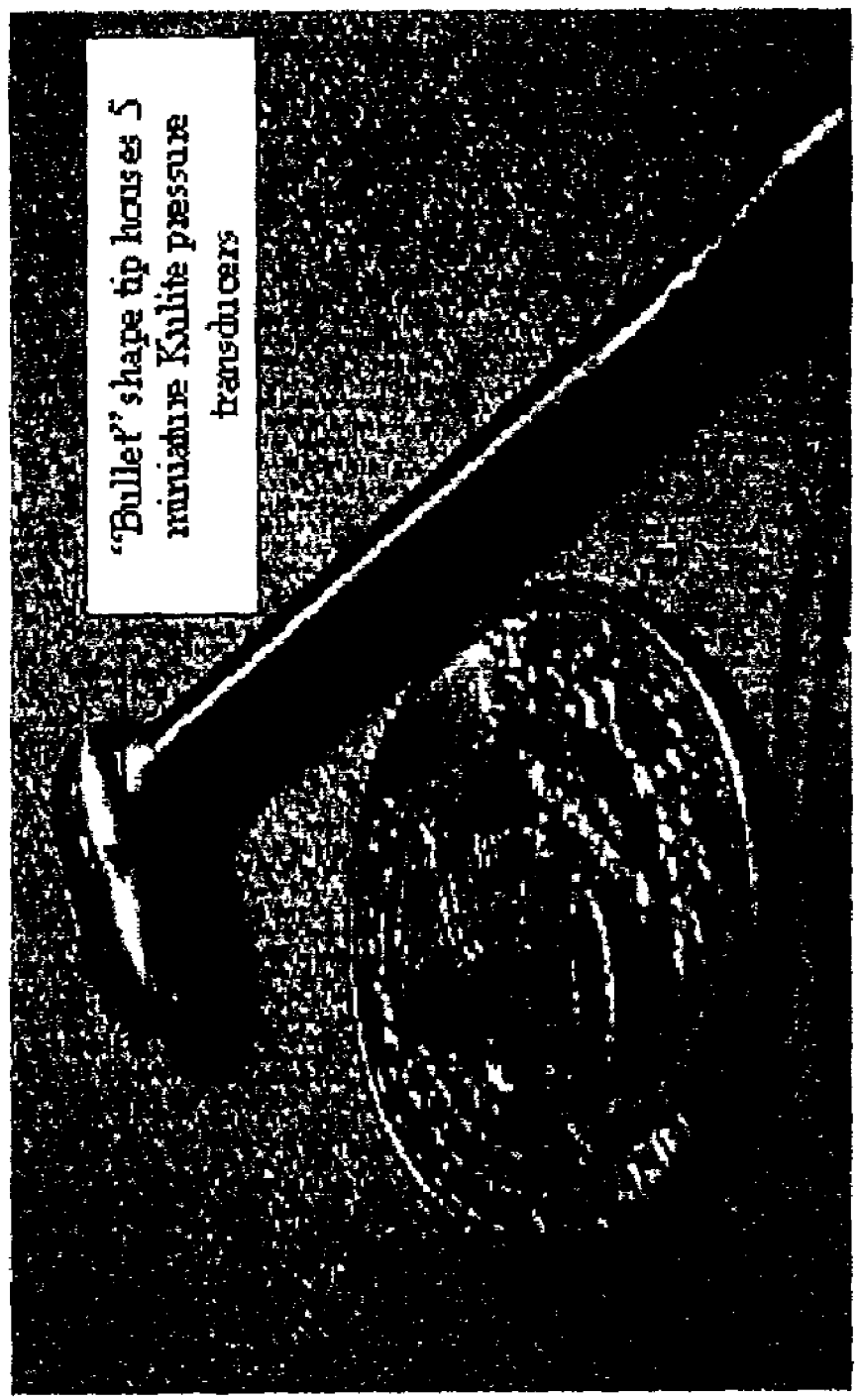
FIG. 2 is a close up of a hemispherical-tip five-sensor embedded transducer probe.

FIG. 2 shows a close-up picture of a hemispherical-tip five-sensor embedded transducer probe which has a frequency response of at least 20 kHz, and operating temperature as high as 400 degrees Fahreheit, yet is small enough to fit between the stages of a range of different turbine engines where flow measurements were desired. In this embodiment, the probe tip diameter is dictated by the size of the pressure transducers. By using a transducer of 1/16" in diameter, a minimum probe diameter of 1/4" can be made. The transducer frequency response can be as high as 100 kHz.

Figure 3:
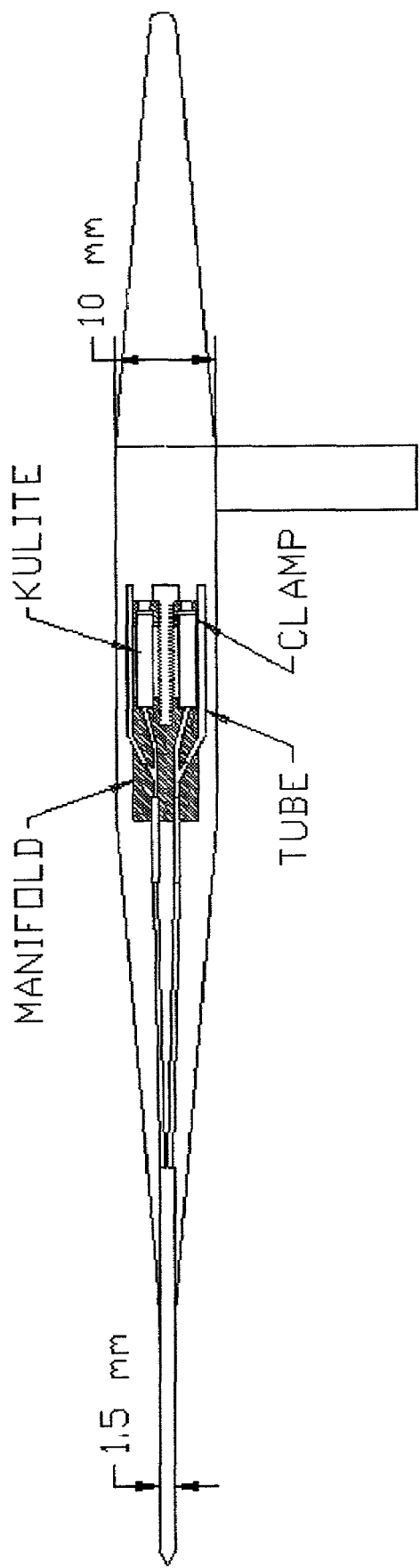
FIG. 3 is a cut-away view of a cryogenic embedded-sensor probe.

In order to maintain a small probe tip diameter (for high spatial resolution of measurement) while still having a high frequency response, the pressure transducers are embedded inside the probe but at a small distance from the tip, as shown in FIG. 3. The probe tip 10 is kept small (1.5 mm in dia.) and short tubing 11 runs from the tip holes 12, 13 to the pressure transducers 14 which are embedded inside an enlarged section of the probe. Usually this distance is on the order of 2". Since a finite length of tubing is introduced in this embodiment, the frequency response, without any compensation, is lower than if the transducers were embedded right at the tip, as was the case in FIGS. 1 and 2. To correct for the response of the tubing appropriate algorithms have been developed. The algorithms are explained subsequently in this text.

Figure 4:
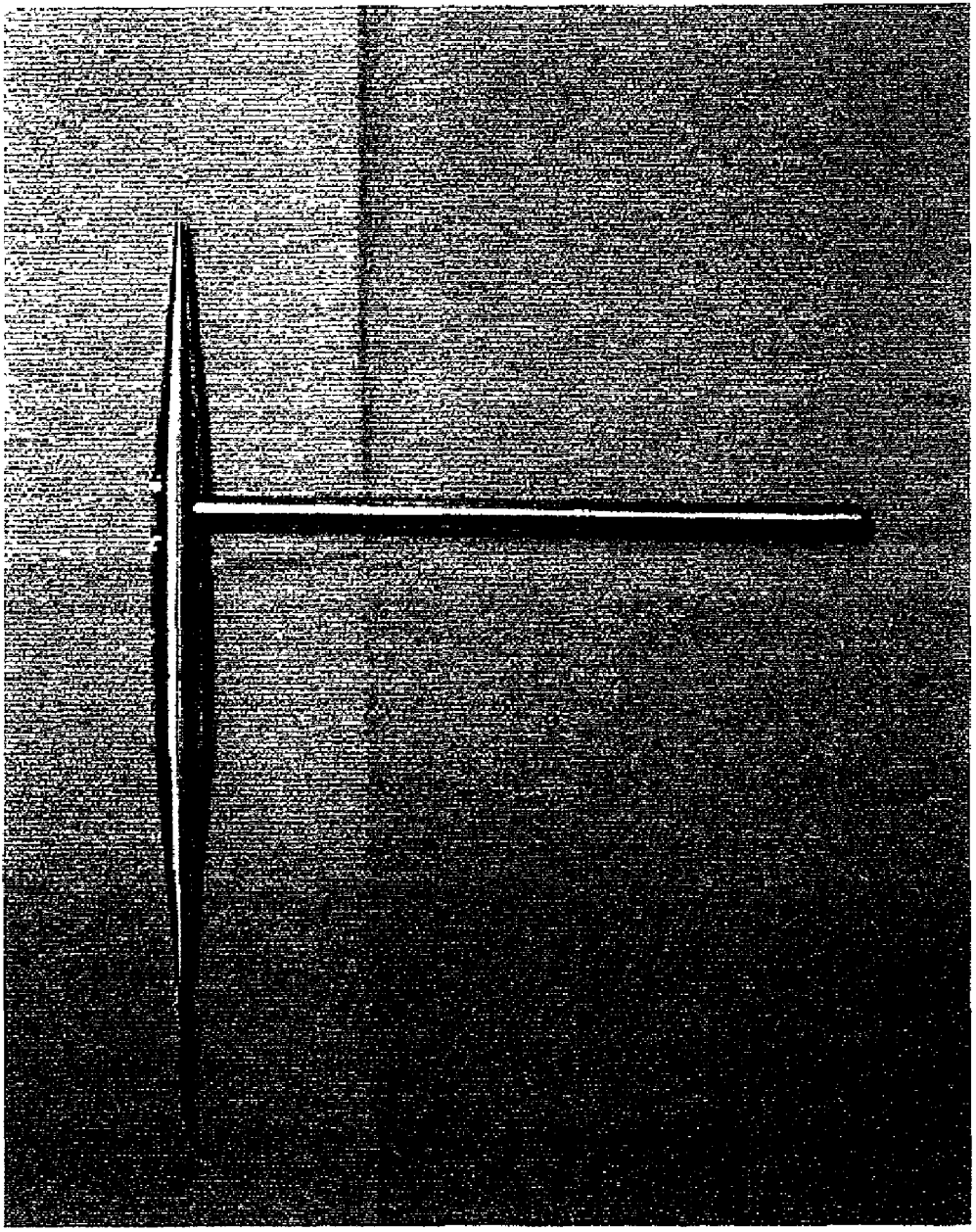
FIG. 4 is a picture of a completed cryogenic embedded-sensor probe.
Figure 5:
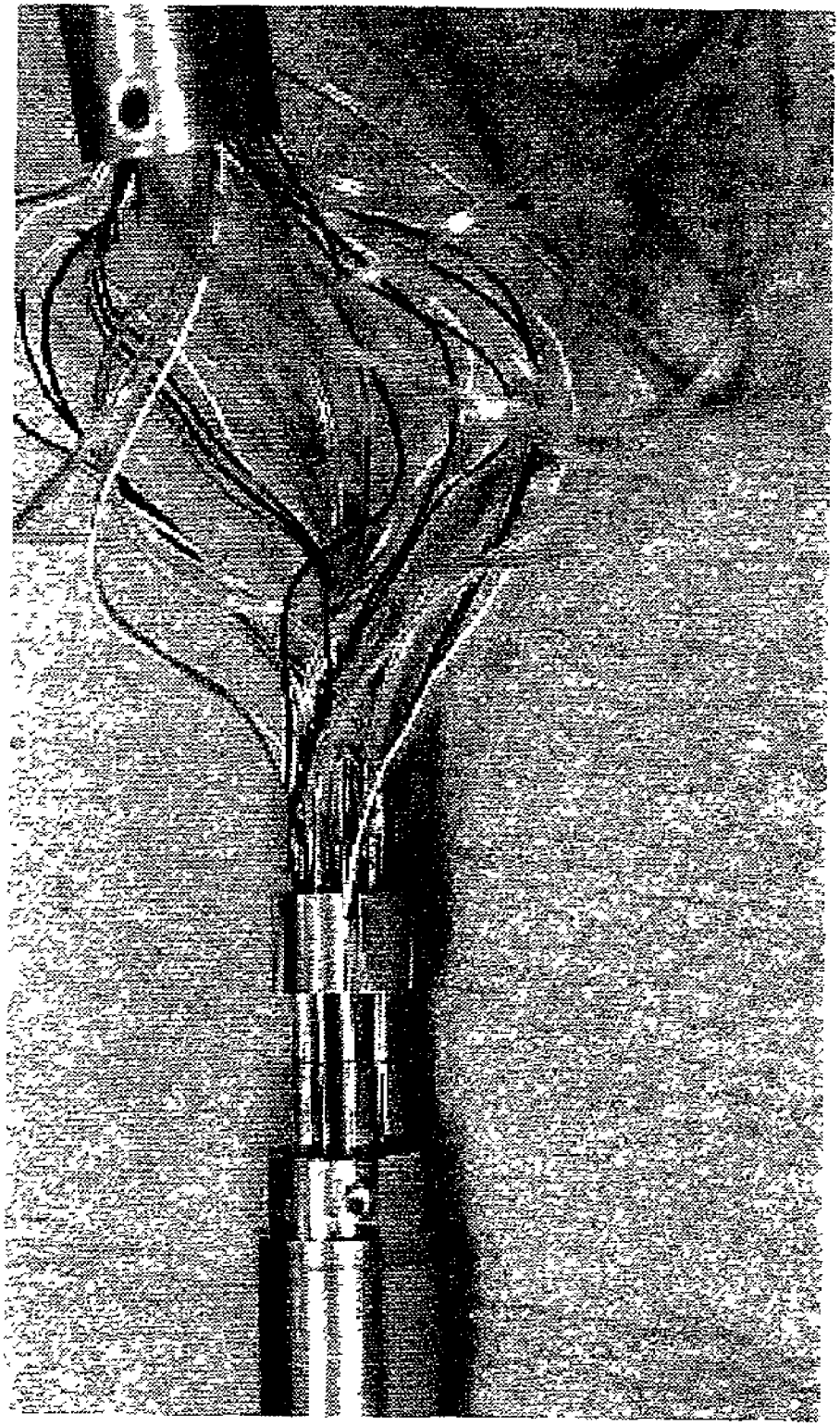
FIG. 5 is a picture of the internal structure of the cryogenic embedded-sensor probe.

FIGS. 4 and 5 show pictures of the probe represented in the schematic of FIG. 3. This particular instrument was developed to provide simultaneous information on the three instantaneous components of velocity, the static and total pressure at a measurement point in dynamically changing flows, especially, in high Mach and Reynolds number and cryogenic conditions. FIGS. 4 and 5 show pictures of the completed probe and its internal detail, illustrating details of the Kulite transducer housing scheme inside the probe. The frequency response of the probe is 1 kHz and can operate at temperatures as low at 180 degrees K.

Flow Control Probe

Figure 6:
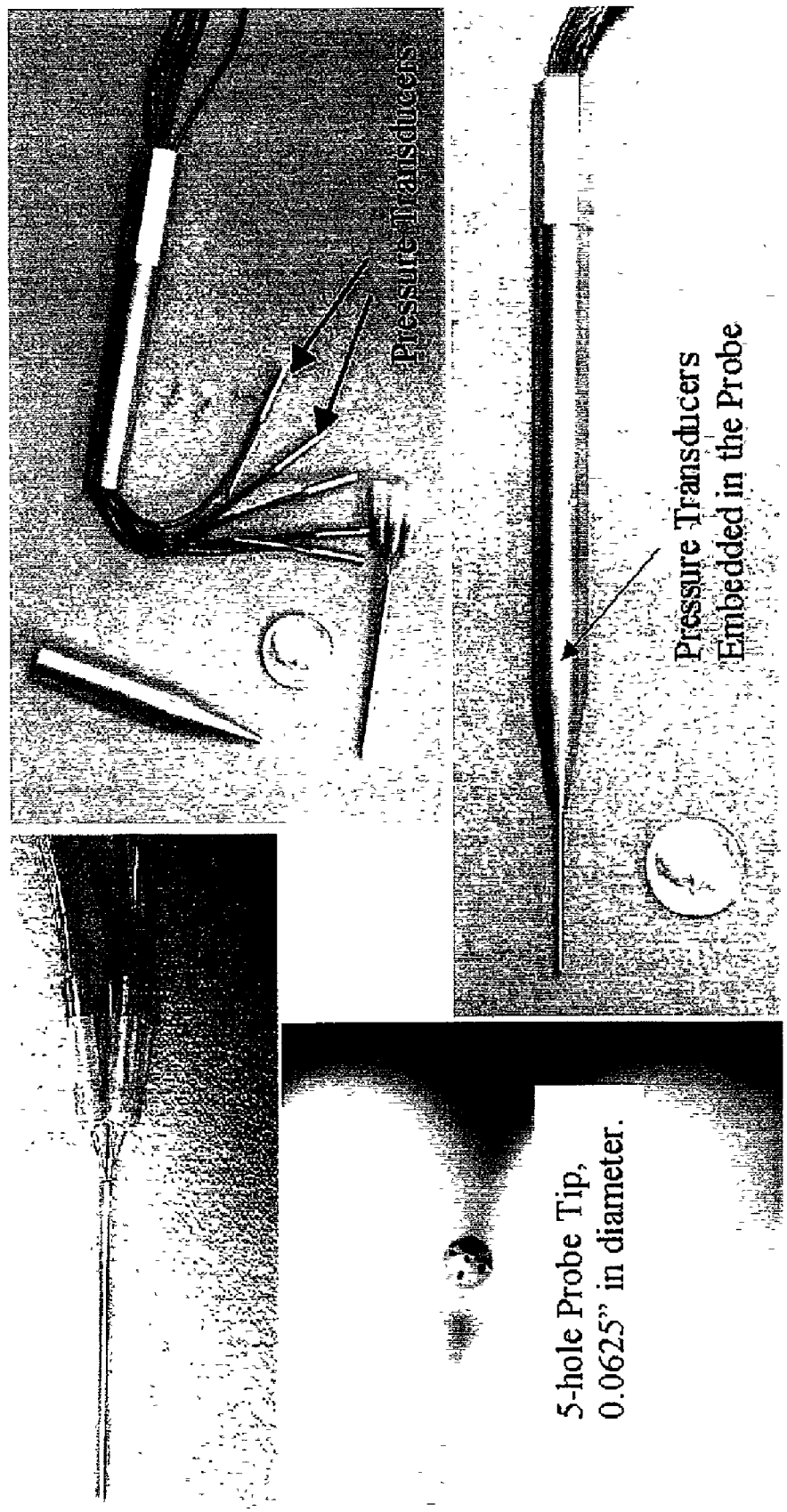
FIG. 6 are pictures of an embedded-sensor (Endevco) probe.

A similar 5-sensor probe developed for flow control experiments is shown in FIG. 6. The tip diameter is 0.0625" and the body diameter is 0.375". Five miniature Endevco pressure transducers (8507C-2) with a pressure range of plus or minus 2 PSIG are installed inside the probe body. The distance from the probe tip to the transducers was 2" and the inside diameter of each of the five tubes is 0.010".

The frequency response of the probe has been extensively tested. The figure at the bottom shows its frequency response amplitude (ratio of pressure sensed by transducers over the true pressure applied at the tip). The figure shows that even without any frequency response enhancement (please see next section), at most a 2% error in the measurement of the true pressures occurs at frequencies up to 500 Hz. With the numerical frequency response enhancement this error can be reduced to less than 0.5%. The more parabolic or hyperbolic the flow is (higher velocities), the shorter you can make the tip of the probe. A 1" long probe tip will take the frequency response up to 900 Hz. The frequency response can be further enhanced if you go to a larger probe tip diameter, say 0.125". With numerical frequency response enhancement for periodic flows, the frequency response can be pushed to kHz.

UAV Probe

Figure 8:
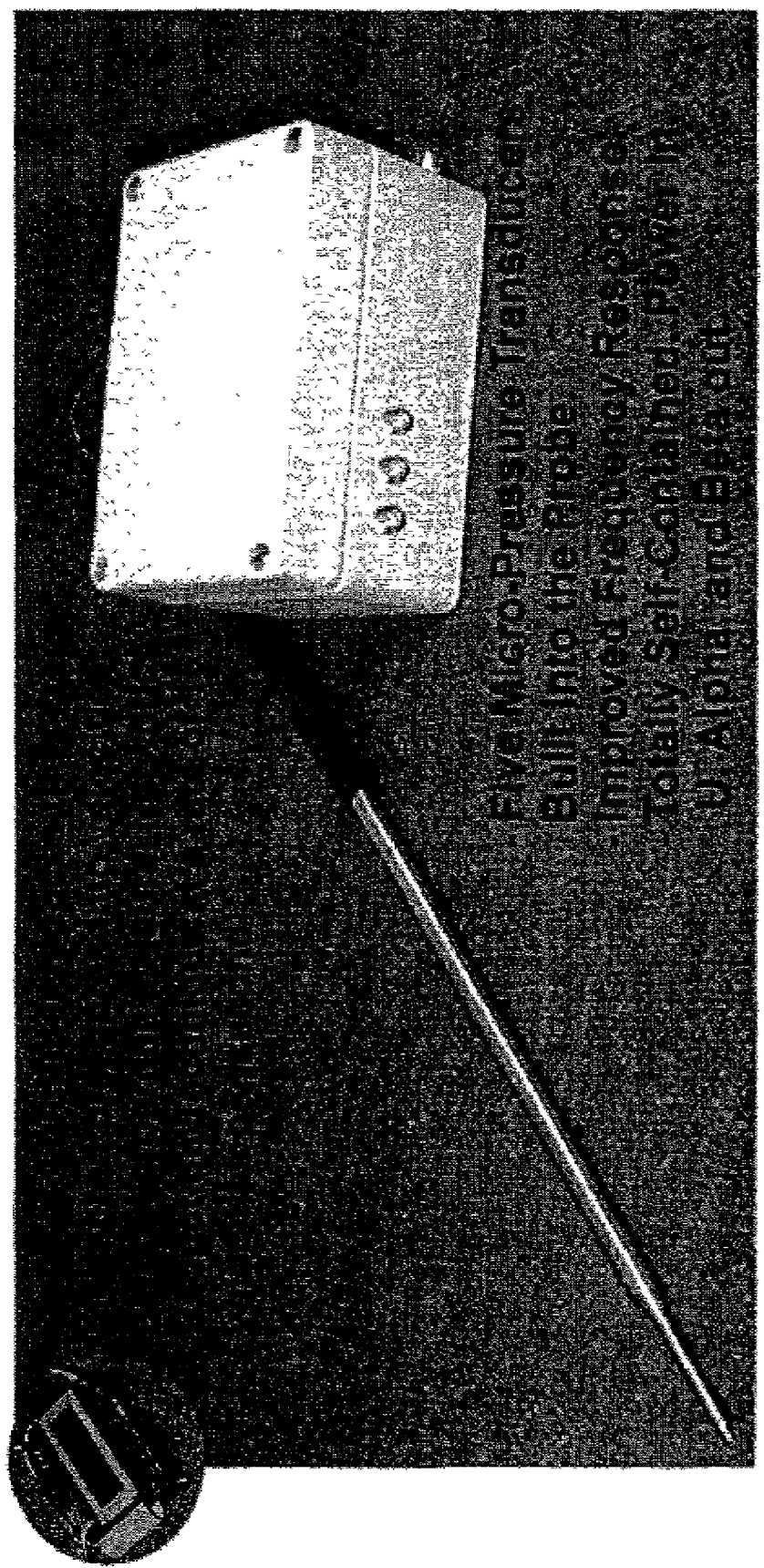
FIG. 8 is a picture of an embedded-sensor probe for UAV market.

For the Unmanned Aerial Vehicle (UAV) market, there is provided an embedded-sensor probe that features a self-contained control computer, which acquires the voltages from the transducers, and then reduces the pressures to velocity components, on-line (FIG. 8). The control computer uses very little power requiring just 12 volts DC. Outputs from the computer are in the form of voltages, which are scaled to a predetermined range. These voltages can be hooked directly into your flight data system and represent the airspeed U, angle of attack $\alpha$, and yaw angle, $\beta$.

Figure 7:
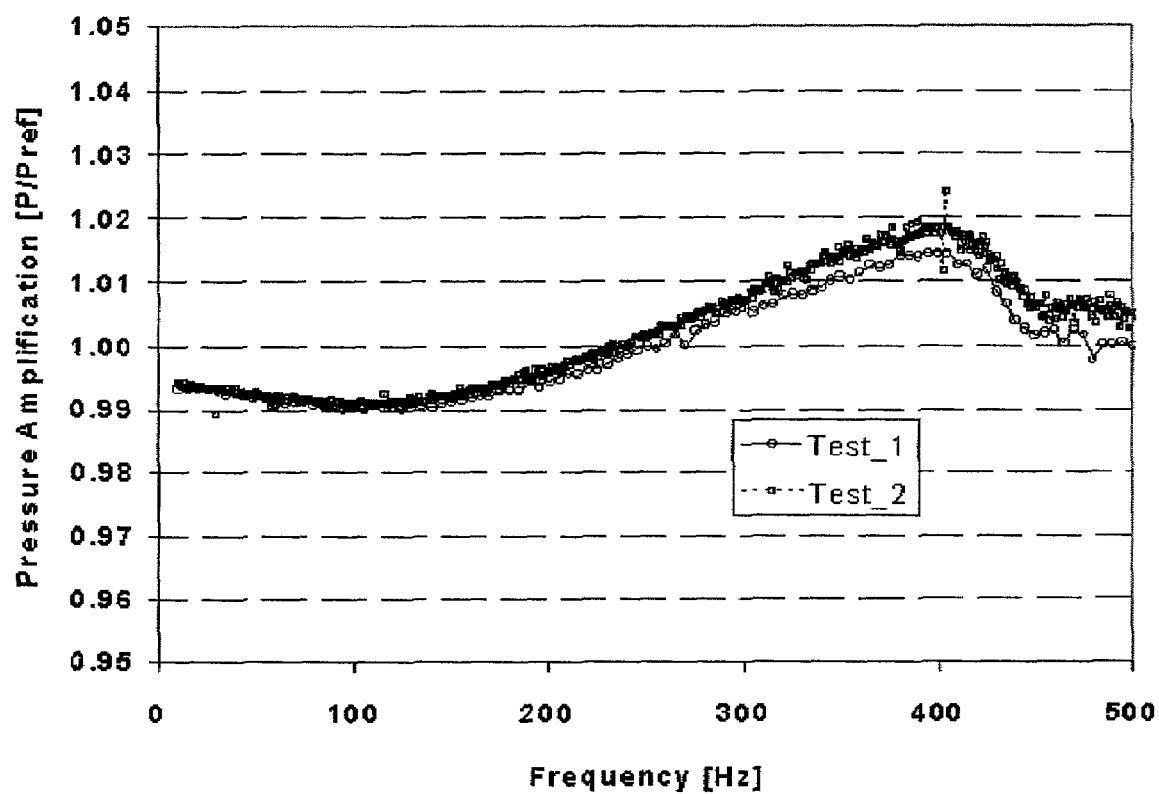
FIG. 7 is a frequency response curve for the probe of FIG. 6.

FIG. 7 shows the frequency response curves for the probe shown in FIG. 6. with Frequency plotted against pressure amplification (P/pref FIG. 8 shows a picture of an embedded-sensor probe integrated with on-line data reduction system for the UAV market.

MEMS Probe

Figure 9:
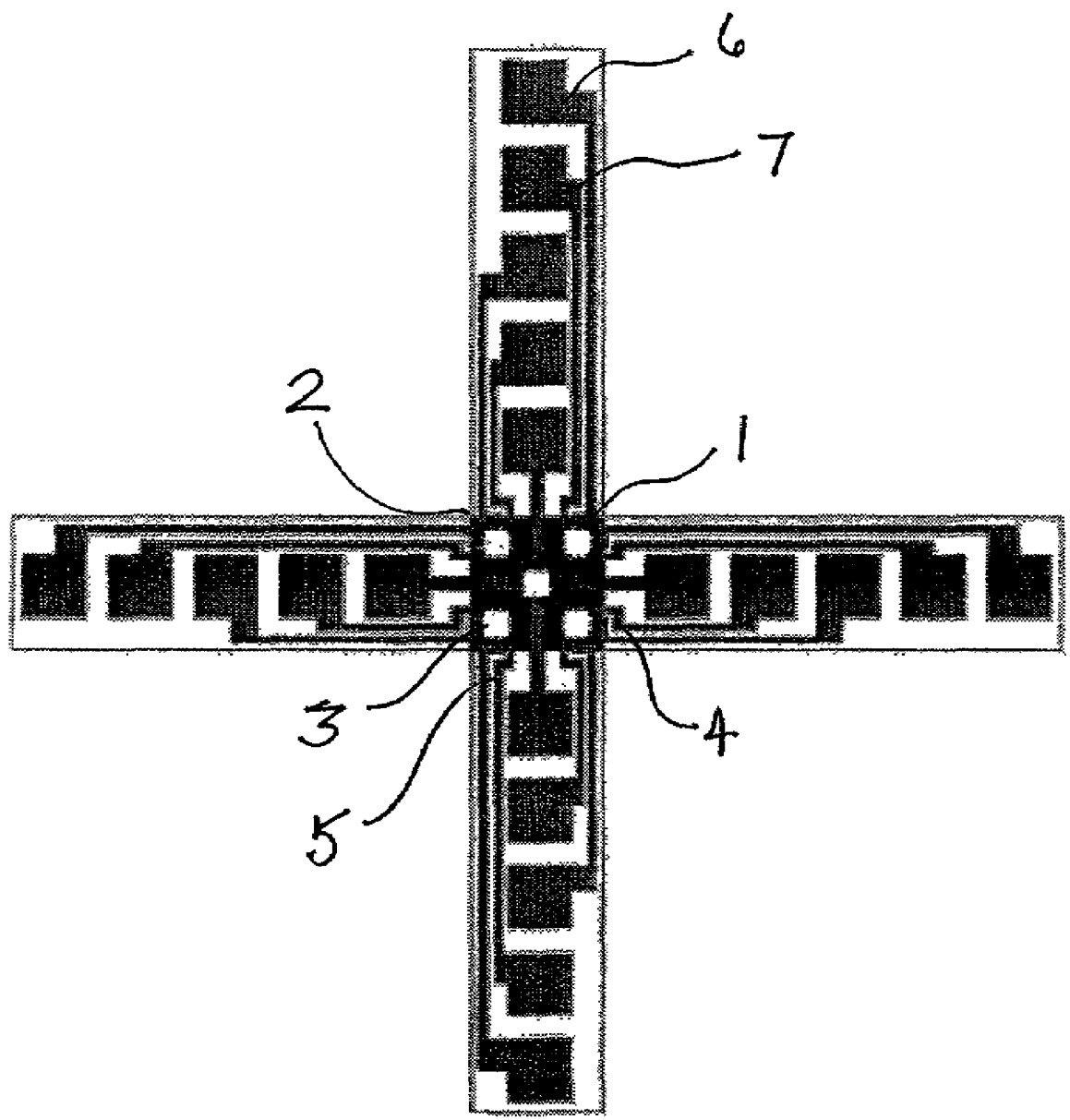
FIG. 9 shows a layout of the pressure sensor array.
Figure 10:
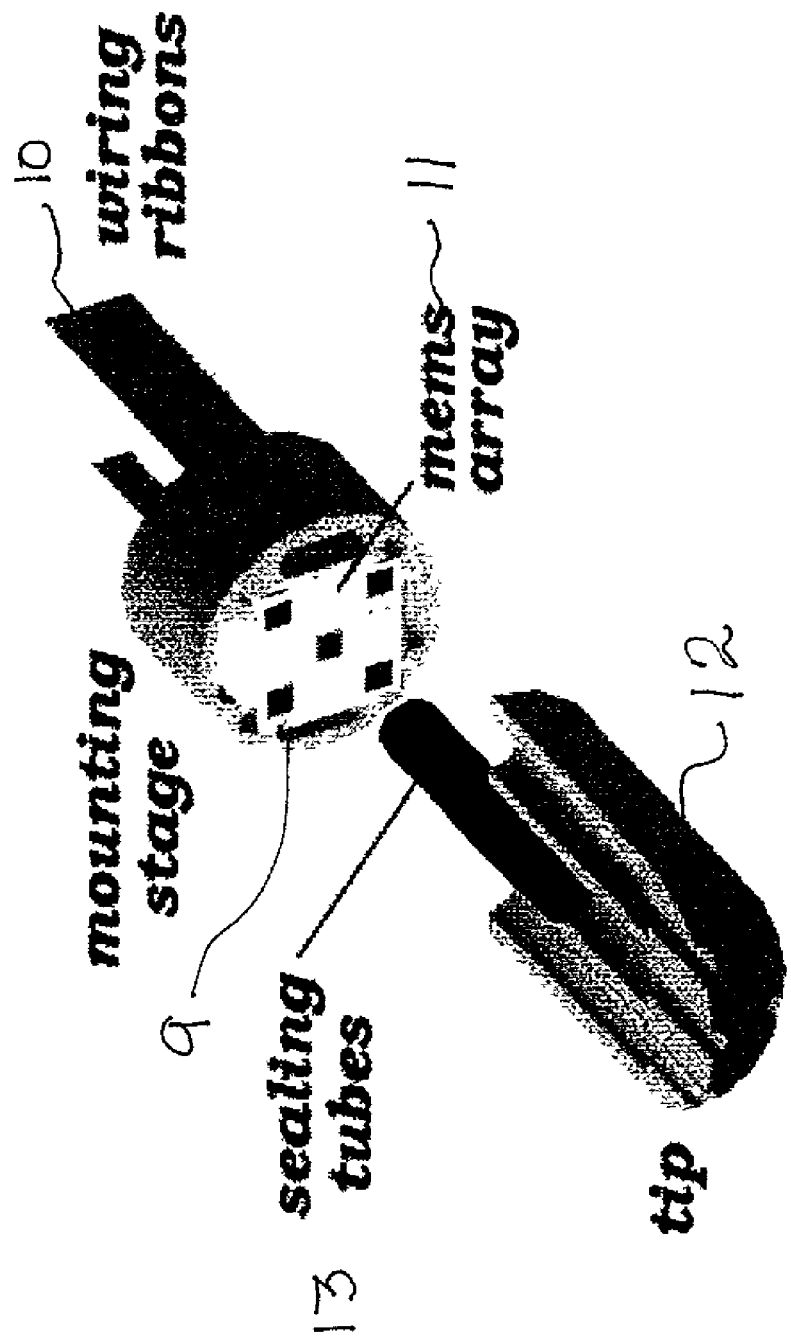
FIG. 10 is an exploded view of the MEMS 5-sensor probe.
Figure 11:
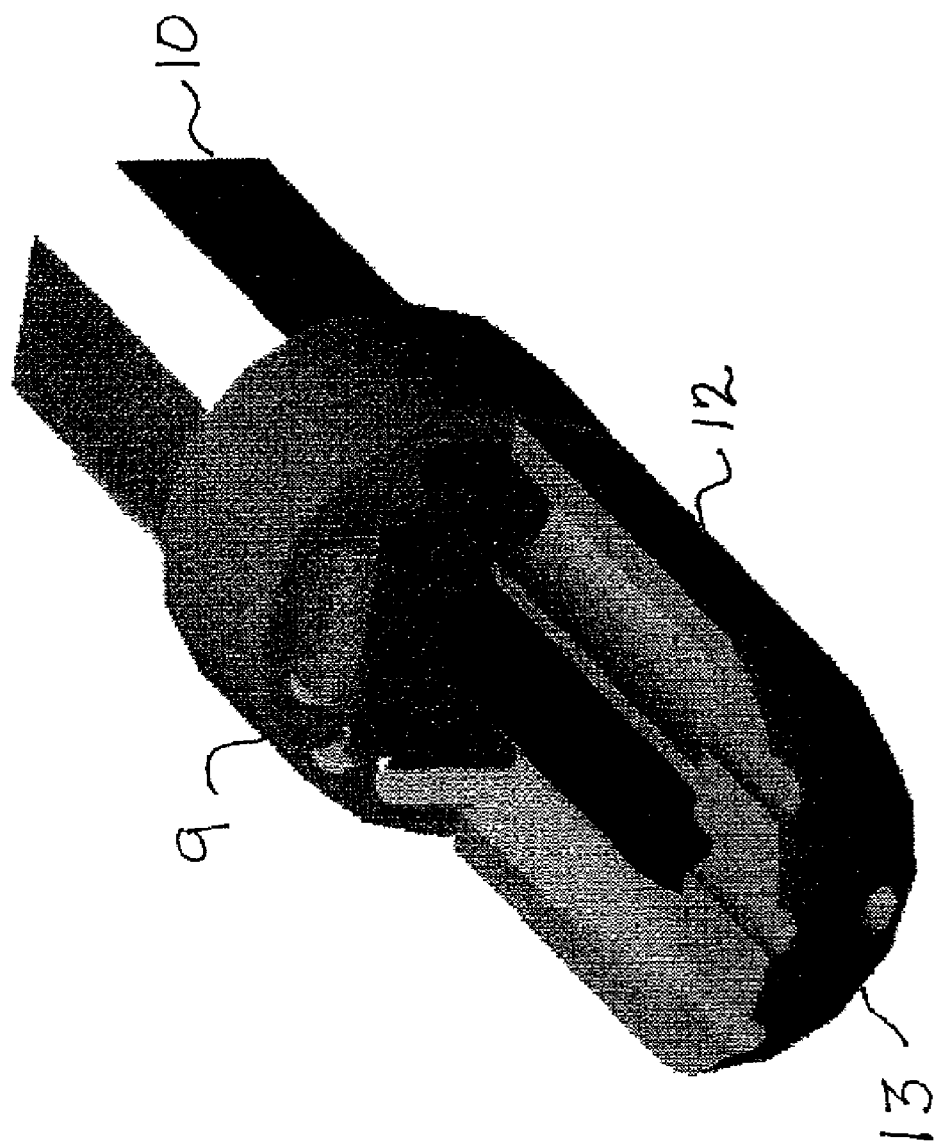
FIG. 11 is a cut-away schematic of the assembled probe.

Another embodiment is the use of a small-tip 5 or 7-hole probe with micro-size pressure transducers embedded at the probe tip. This embodiment is shown in FIGS. 9 through 11. The embodiment combines the advantages of the previous two embodiments. It maintains a small probe tip diameter while embedding the pressure transducers right at the probe tip for maximum frequency response. This is a MEMS (Micro-Electronic-Mechanical System)-based, high-performance, fast-response, multi-sensor pressure probe of miniature size for velocity and pressure measurements in unsteady and turbulent flowfields. The embodiment uses a sensitive MEMS pressure sensor array with 5 pressure sensors, each measuring 250 microns by 250 microns in size.

The MEMS pressure sensors are surface micromachined and contain bossed diaphragm structures for improved sensitivity. The sensors are fabricated in an array of five onto a flexible skin in the shape of a cross as shown in FIG. 9. The layout for the skin is shown in the figure. The central square is approximately 1.2 mm. on a side and contains five pressures sensors, noted as 1 though 5 on the drawing (shown as white squares). Electrical access to the pressure sensors is provided by the square pads, such as 6 and 7, on the four arms of the cross.

FIG. 10 shows an exploded view of the probe schematically illustrating the various components as they are being assembled while FIG. 11 presents a cut-away view of the assembled probe. The Mounting Stage houses the pressure sensor and the slots 9 for the wiring ribbons 10 go completely through the stage to allow access to the soldering pads on the wires from the MEMS array. The stage plays a crucial role in the assembly of the probe components. The MEMS array 11, the sealing tubes 13, and the tip 12 of the probe are placed relative to the outside diameter of the stage, which also serves as the final connection to the probe housing, after the sensor wires are connected.

Each of the pressure sensors must be coupled with its corresponding hole in the tip, with no chance of leakage or cross talk between ports. This is accomplished by sealing all of the tubes to the MEMS array in one epoxy setting, then sealing the tip to the tubes in a separate epoxy setting. A fixture, referred to as the "sealer" is used to accurately position the tubes on the MEMS array, so that epoxy can be placed around the outside diameter of each tube. After the epoxy has cured, the tip is fitted over the ends of the tubes and new epoxy is placed around the outside of each tube before completing the joint.

Omni-Directional Spherical Probe

Figure 12:
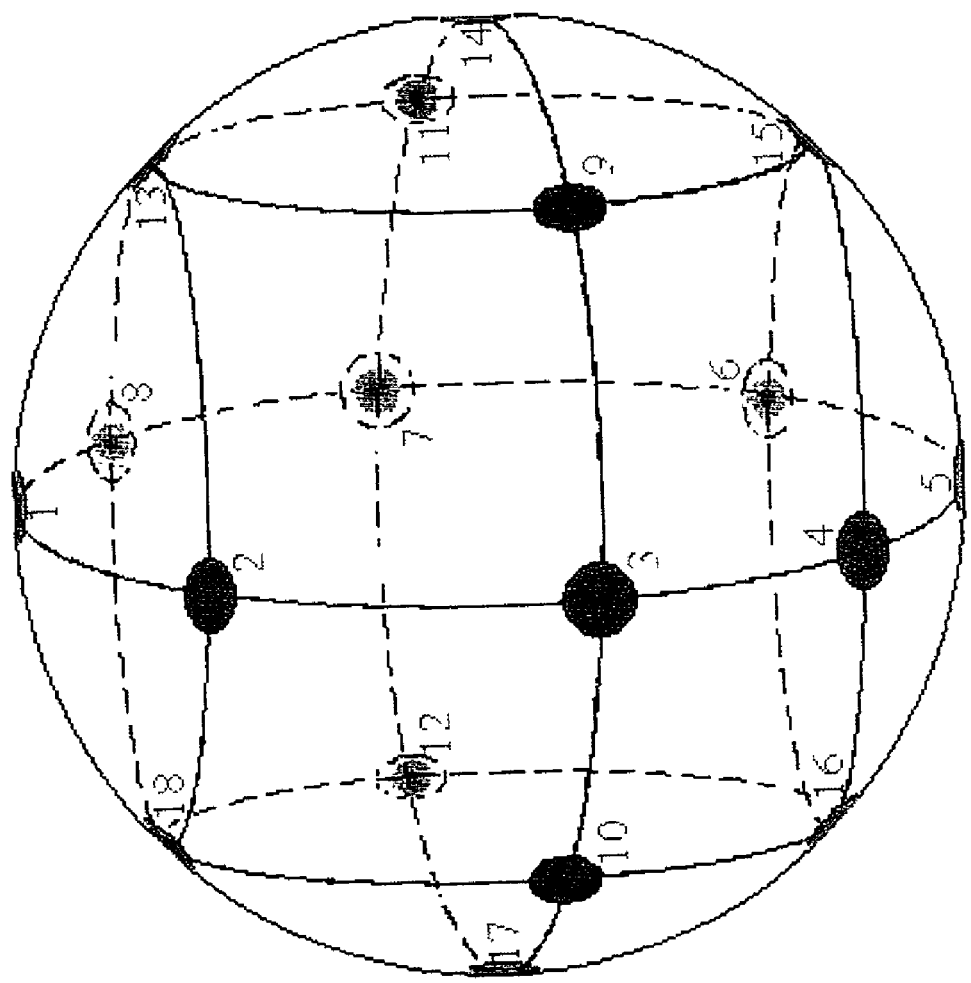
FIG. 12 is a showing of sensors arrayed on a spherical surface.

For a miniature, omni-directional three-component flow velocity measurement pressure probe with fast dynamic response, a total of 18 sensors can be mounted on a spherical tip (3 mm in diameter). Flexible skin technology is the solution that meets all the constraints. The sensors are fabricated on thin flexible strips with electrical connections and these strips are mounted on the spherical surface with electrical leads connected to inside the body of the probe as shown in FIG. 12. The probes are noted as 21 through 38 in the drawing mounted on sphere 39.

Flexible Pressure Sensor Strip

Figure 13:
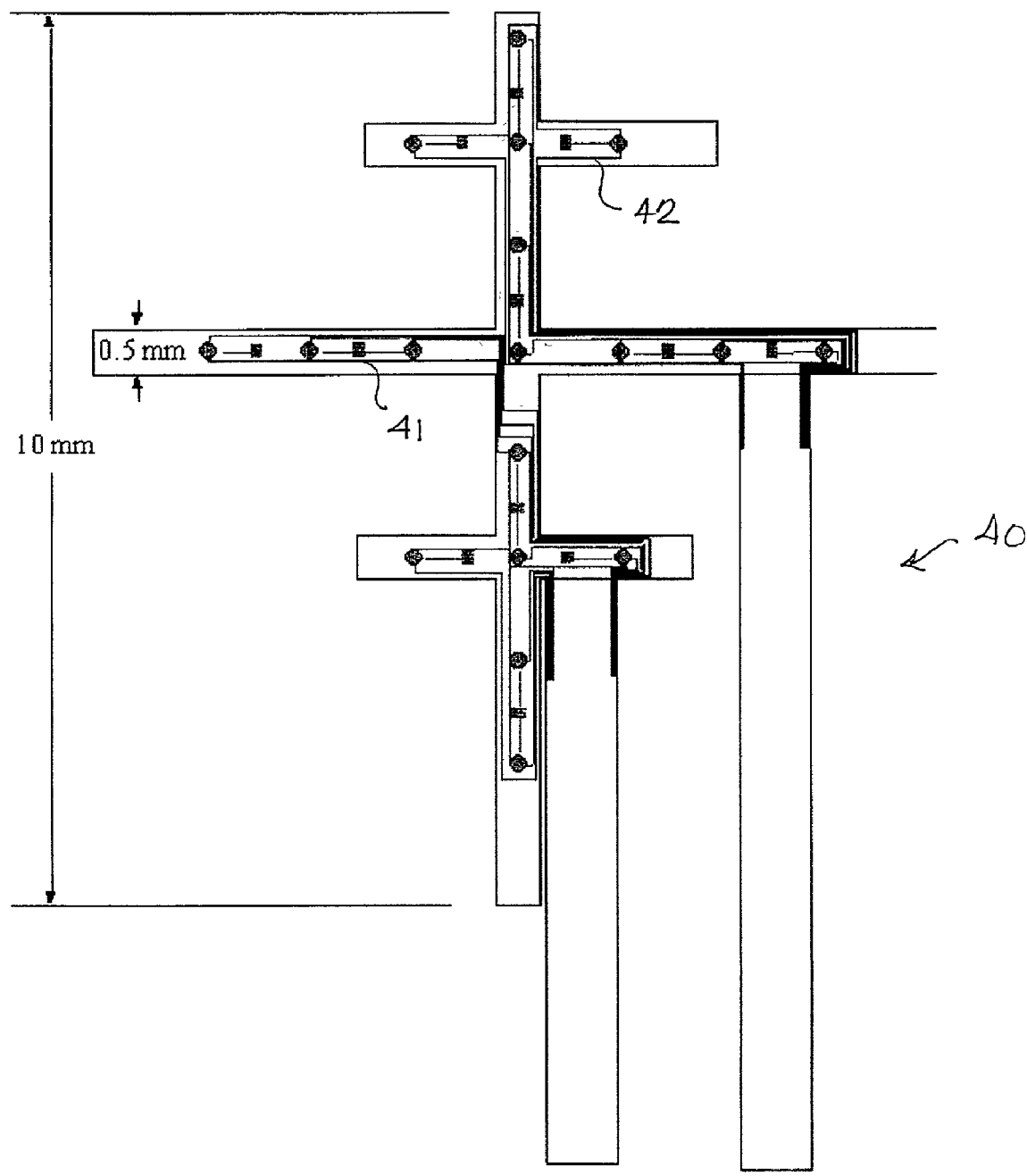
FIG. 13 shows the layout of the flexible pressure sensor strips.

FIG. 13 shows the layout design of the flexible pressure sensor strip 40. The probe has grooves 41, 42 machined into the surface with a depth equal to the thickness of the skin (typically 80 $\mu$m.) so that the skin can be flush mounted on the surface of the probe. Polyimide-based ribbon cable 43 is used for electrical leads.

Large Omni-Directional Spherical Probe

Figure 14:
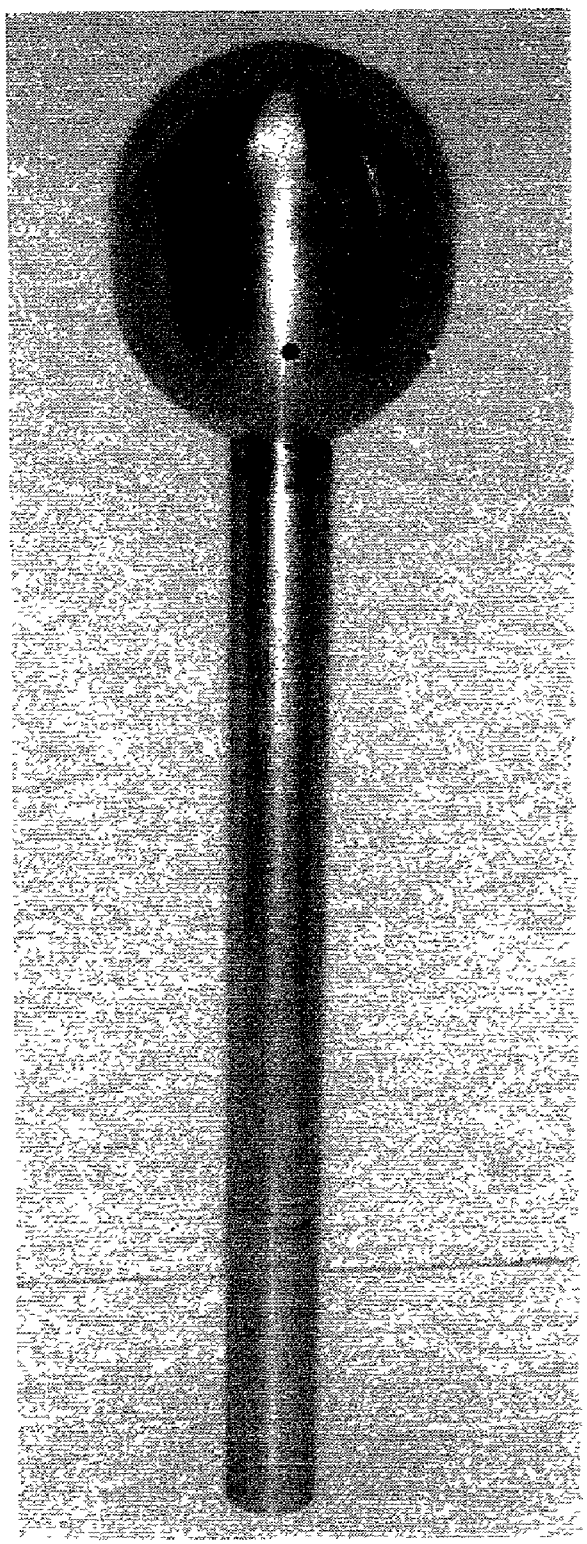
FIG. 14 shows an assembled omni probe.
Figure 15:
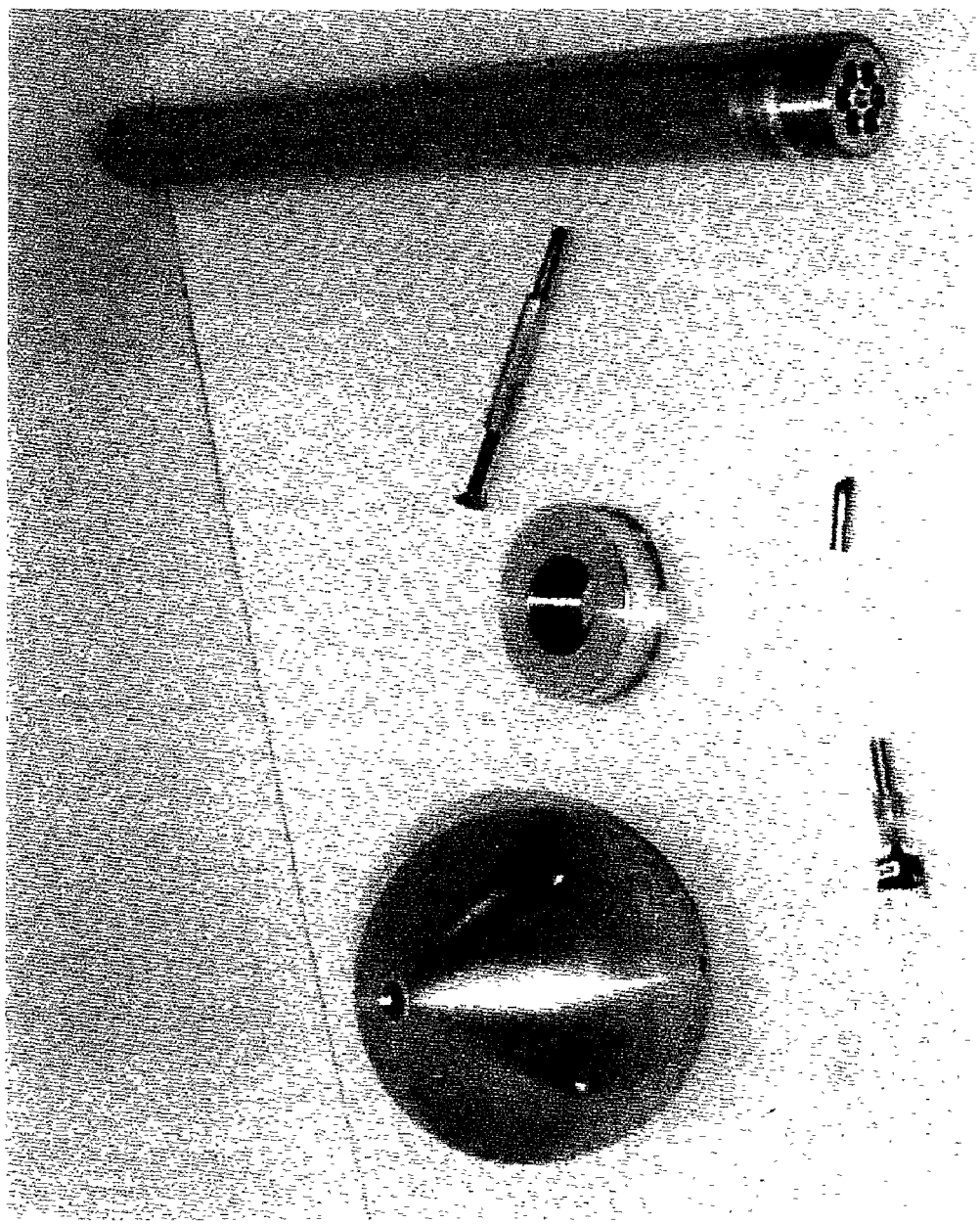
FIG. 15 shows a disassembled omni probe.

Referring row to FIG. 14 there is shown an assembled large omni-directional probe 50 (with 10 pressure ports) with the pressure transducers embedded inside the spherical head. FIG. 15 shows a disassembled probe with components from left to right being probe head 51, Honeywell transducer 52 with tube, probe base 53, tube insert 54, center screw 55, and probe sting 56. Note the head of the probe sting with tapped hole in the center and six peripheral holes for electrical connections. This specific probe is for omni-directional measurements of the wind, for weather-monitoring applications.

Another version of this embodiment has the pressure transducers embedded inside the probe sting. This allows for a small tip (sphere) diameter for better spatial resolution but introduces some finite length of tubing from the tip holes to the transducers. However, with the innovative frequency response enhancement algorithms, later described, the frequency response is still maintained at high levels.

Multi-Hole Probe

Figure 16:
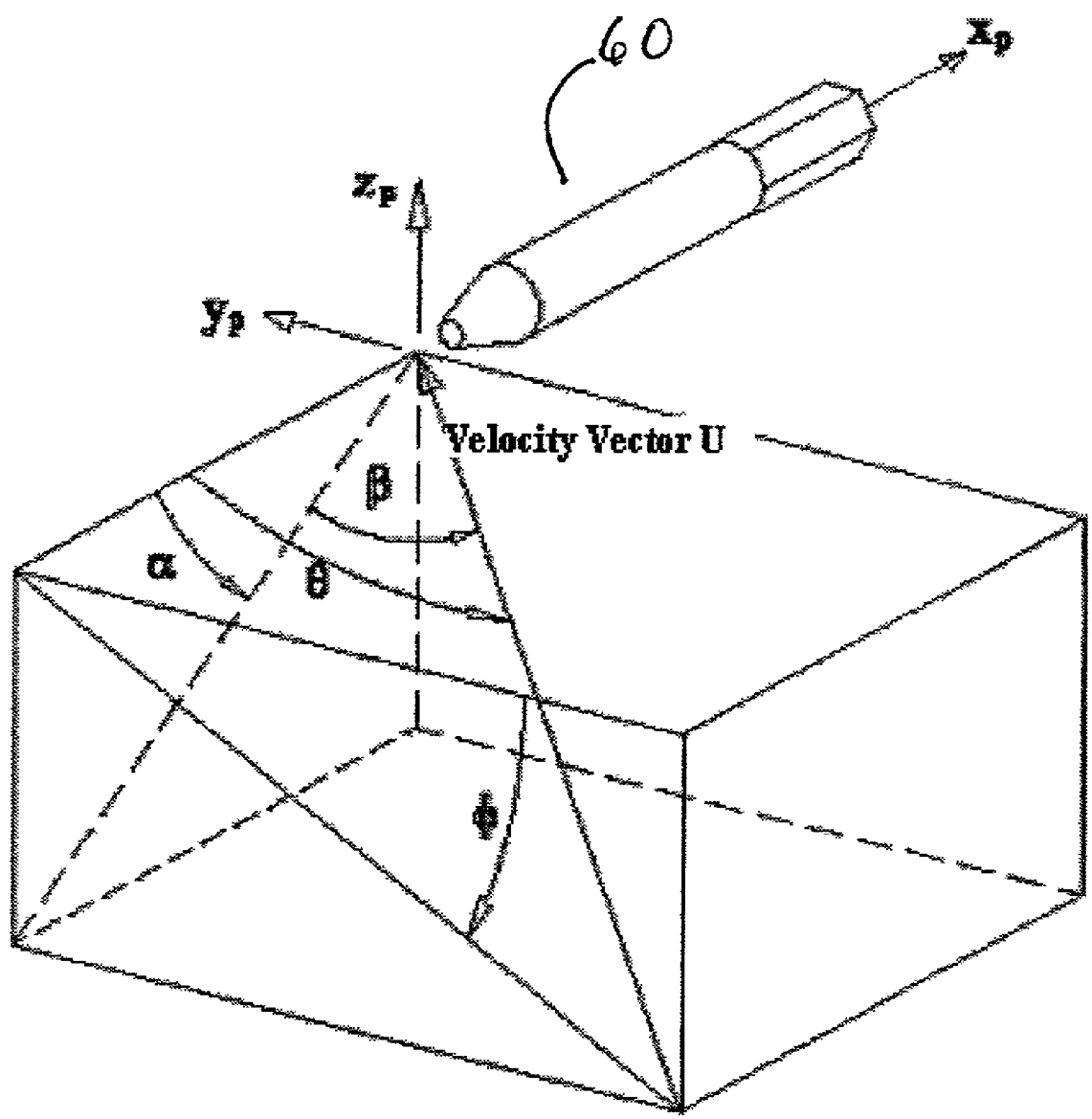
FIG. 16 shows a schematic representation of a probe tip, velocity vector and its orientation.

FIG. 16 shows the theory of a multi-hole probe. It shows schematically the probe tip 60, the flow velocity vector v, and its orientation (angles $\theta$ and $\Phi$) with respect to the probe-fixed coordinate system xyz. The unknowns that are to be determined, by measuring the 5 or 7 probe pressures at the tip, are: the velocity magnitude V, the two flow angles $\Phi$ and $\theta$ and the static pressure p$\zeta$. The geometry of the probe tip can be conical, hemispherical, faceted, or spherical and can have a different number of holes. These different shapes evolved due to several different reasons, but their principle of operation in its basis is exactly the same as that for a hemispherical or a spherical tip geometry. This is why, the discussion following is based on a spherical probe tip, which is geometrically simple and has closed-form solutions for the potential flow over it.

Figure 17:
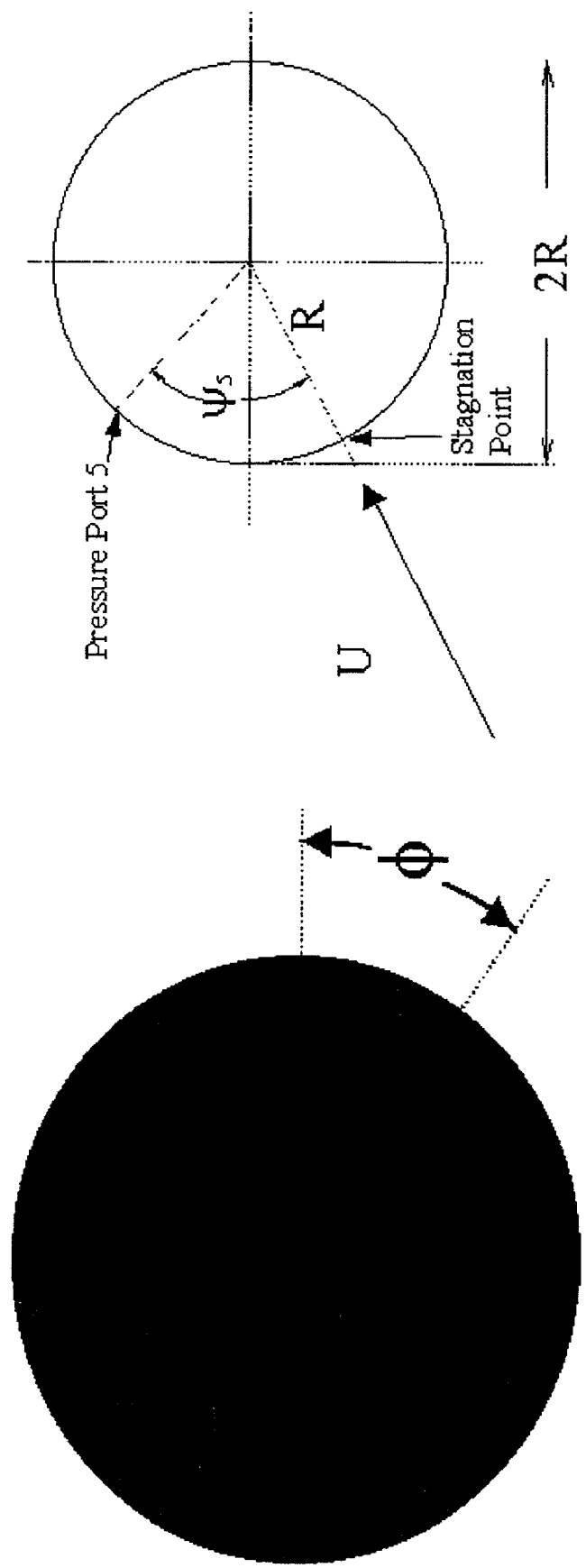
FIG. 17 shows the front view of a spherical probe tip and a cross-section thereof.

FIG. 17 shows a front view of a 5-hole, spherical probe tip 70. The 5 circles represent the 5 pressure ports 71 to 75. The line connecting the central port 71 with the center of the sphere defines the probe axis x (FIG. 16.) When the probe is inserted in a flowfield, the flow will stagnate at some point on the tip surface. The location of the stagnation point depends on the flow angularity, i.e., the orientation of the velocity vector with respect to the probe axis x (angles $\Phi$ and $\theta$). The star in FIG. 2 represents the flow stagnation point. The location of the stagnation point on the probe tip is completely defined by the two angles $\theta$ and $\Phi$, also indicated in FIG. 17a. So if pi, with i taking values from 1 to 5, are the five measured port pressures, the objective is to determine these two angles as well as U and pi from these 5 pressures.

In seeing how the pressures pi relate to the four unknowns ($\Phi$, $\theta$, U, p) we look at port 5, for example. FIG. 17b shows a cross section of FIG. 17a on the plane defined by pressure port 5, the stagnation point and the center of the sphere. The angle that the velocity vector forms with port 5 (or the line connecting port 5 to the center of the sphere) is $\Psi$. This angle is shown in both FIGS. 17a and 17b. Assuming potential flow and applying the steady Bernoulli equation we get the following expression for the pressure at port 5.

$$p_5(\psi_5, U, p_s) = p_s + \frac{1}{2} + \rho U^2 \left( \frac{9}{4} \cos^2(\psi_5) - \frac{5}{4} \right) \quad (1)$$

Similar analysis for the other 4 ports gives us (for the generic port i):

$$p_i(\psi_i, U, p_s) = p_s + \frac{1}{2} + \rho U^2 \left( \frac{9}{4} \cos^2(\psi_i) - \frac{5}{4} \right) \quad (2)$$

Now we know precisely the geometric location of port i on the sphere and by applying simple geometric analysis we can easily show that the angle $\Psi$ is simply a function of the two unknown angles ($\Phi$ and $\theta$)., i.e., $$\Psi_i = \Psi_i(\theta, \phi) \quad (3)$$

and equation (2) can be written as:

$$p_i(\theta, \phi, U, p_s) = p_s + \frac{1}{2}+\rho U^2\left(\frac{9}{4}\cos^2(\psi_i(\theta,\phi)) - \frac{5}{4}\right) \quad (4)$$

We now have 5 equations (write equation 4 five times, one for each value of index i), and 4 unknowns. The redundancy (caused by using 5 pressure ports and not 4) is present to insure that at least 4 of the 5 pressure ports are in the attached flow region. If all 5 ports are in attached region any 4 are enough to determine the 4 unknowns. For high flow angularities there are many ways (not described) to identify and use the 4 ports in the attached flow region. If the probe were a perfect sphere, the port locations were accurately known and there was no viscosity in the flow, there would be no need for experimental calibration of the probe. The foregoing theoretical analysis is enough to yield, from the 5 measured pressures, accurate answers for the flow velocity, angularity and static pressure. Since flow has viscosity, the tip is not a perfect sphere and probe machining imperfect it is necessary to use probe calibration.

Steady Probe Calibration

Figure 18:
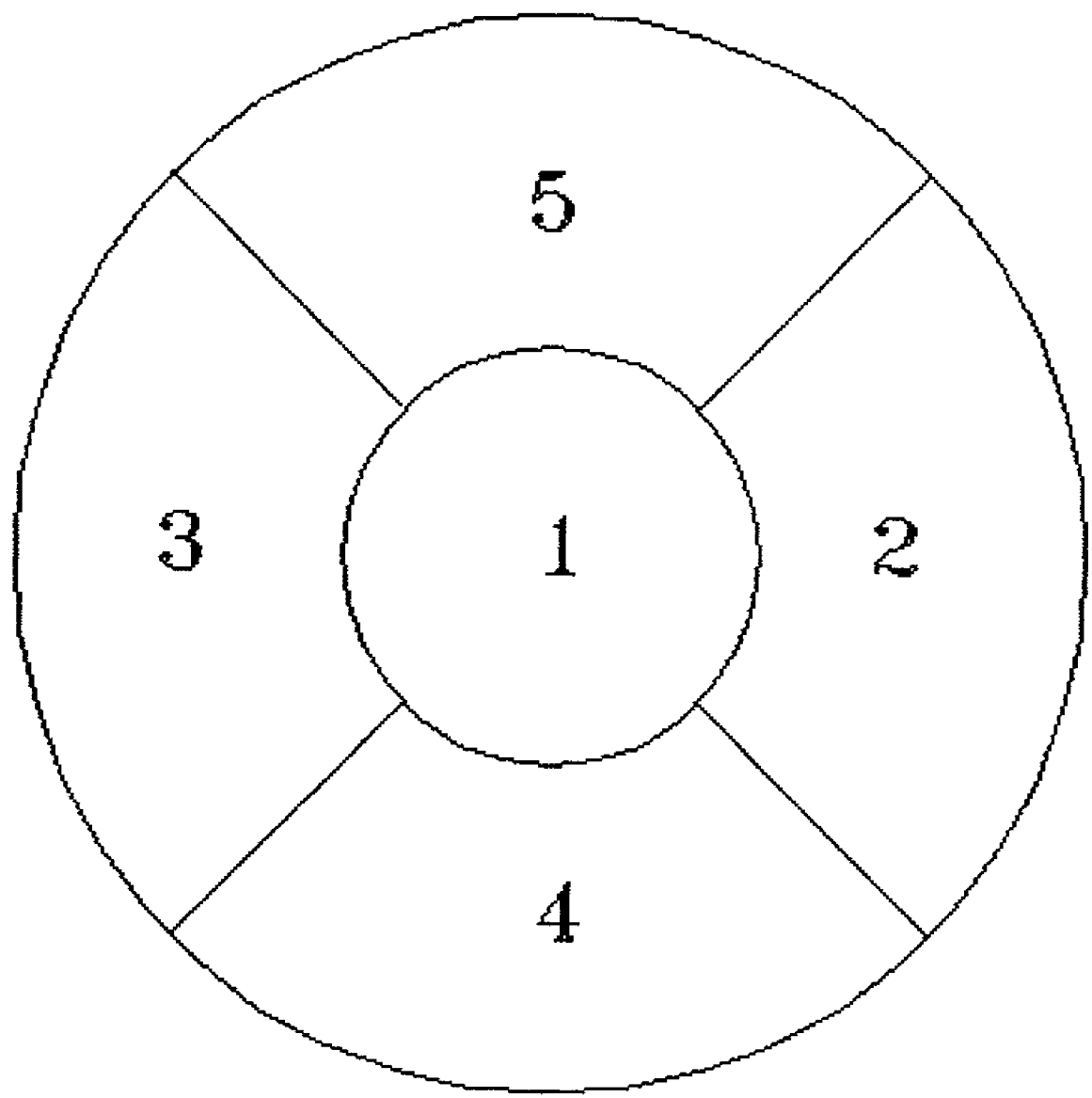
FIG. 18 shows the probe measurement domain.

To accomplish such calibration the flow over a 5-sensor probe can be typically divided into two flow regimes, the first a low-angle (or low angularity) and high-angle (or high-angularity) regimes. For calibration purposes, all possible velocity vector orientations with respect to the probe are represented by five sectors. Each sector, as shown in FIG. 18, is identified by a number indicating the port/sensor that senses the highest pressure for all the possible velocity orientations in that sector. For low-angle flow, the highest pressure is registered by port # 1 (central hole) while for high-angle flows the highest pressure occurs in one of the peripheral holes 2 through 5.

Figure 19:
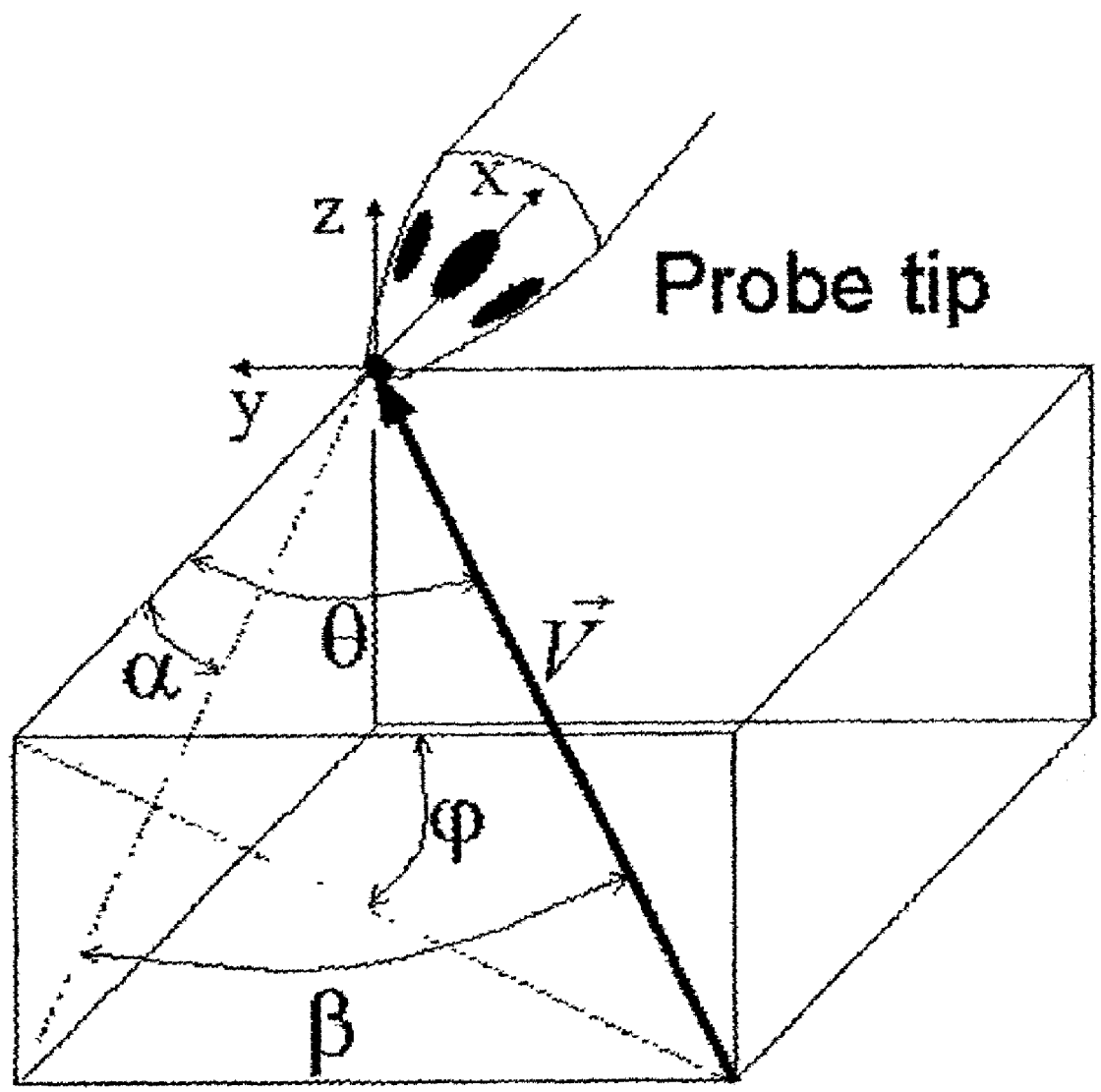
FIG. 19 shows the definition of angles used to define velocity vector orientation.

The local velocity vector at any measurement location can be fully characterized by four variables. For low-angle flow these variables are: pitch angle $\alpha$, yaw angle $\beta$, total pressure coefficient A1, and static pressure coefficient A$\zeta$, For high-angle (or high-angularity) flow the variable are: cone angle $\theta$, roll angle $\Phi$, At and A$\zeta$. These variables need to be determined as functions of the five measured pressures or equivalently, the two non-dimensional pressure coefficients formed from these pressures: b$\alpha$, b$\beta$, for low-angle flow and b$\theta$, b$\Phi$ for high angle (Rediniotis et al), Everett et al). The two different systems of angles (pitch angle $\alpha$, yaw angle $\beta$) and (cone angle $\theta$, roll angle $\Phi$) used to describe the velocity vector orientation with respect to the probe, in low angularity and high angularity flow, respectively, are shown in FIG. 19. For a 5-sensor probe the pressure coefficients for low angle flow and high angle flow are calculated from the 5 measured pressures. The input coefficients b$\alpha$, b$\theta$, will be referred to as b1 and b$\beta$, b$\Phi$ will be referred to as b2 in the remainder of this description because many of the processes described following use both high and low angle definitions in the same manner.

Figure 20:
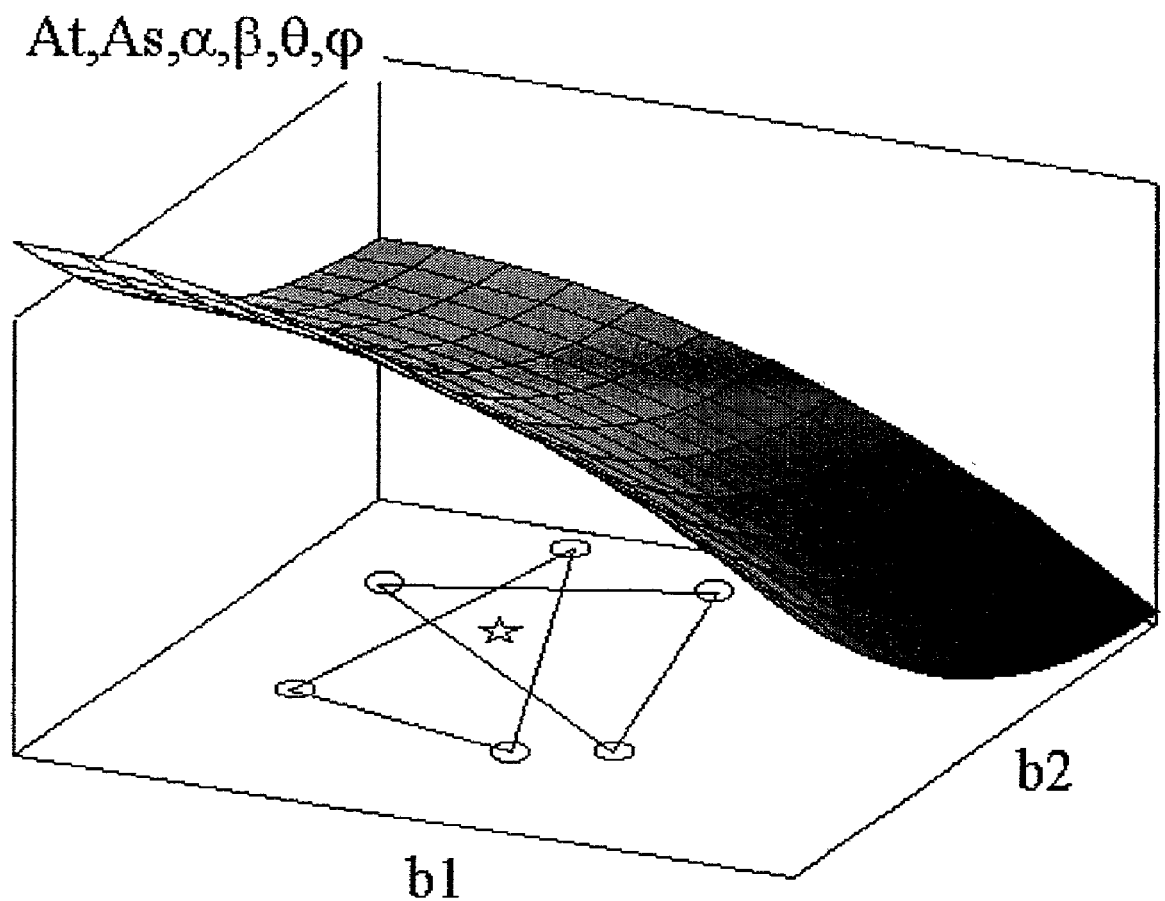
FIG. 20 shows a least-squares interpolation surface.
Figure 21:
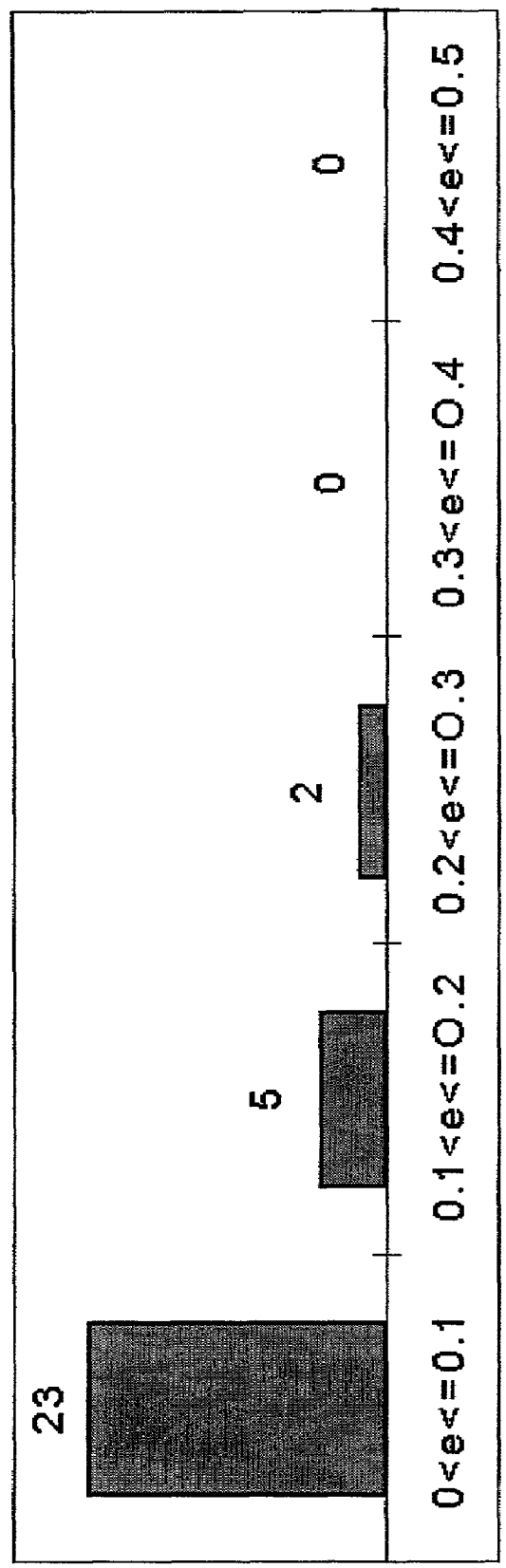
FIG. 21 shows a graph of the pitch angle in degrees.
Figure 22:
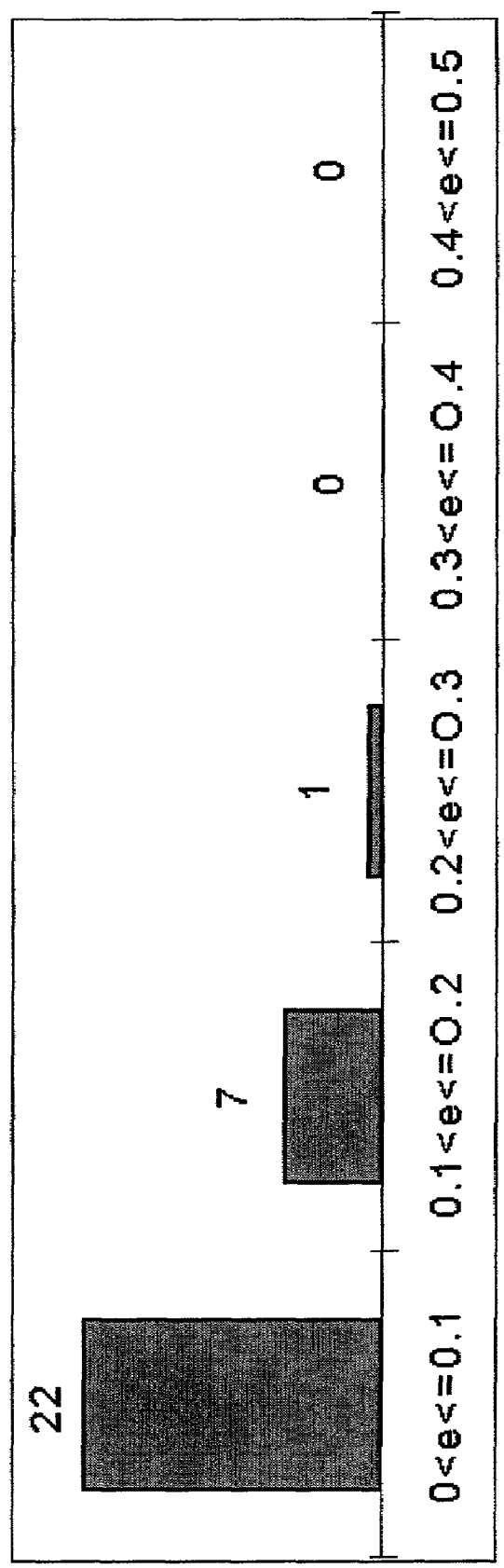
FIG. 22 shows a graph of the yaw angle in degrees.
Figure 23:
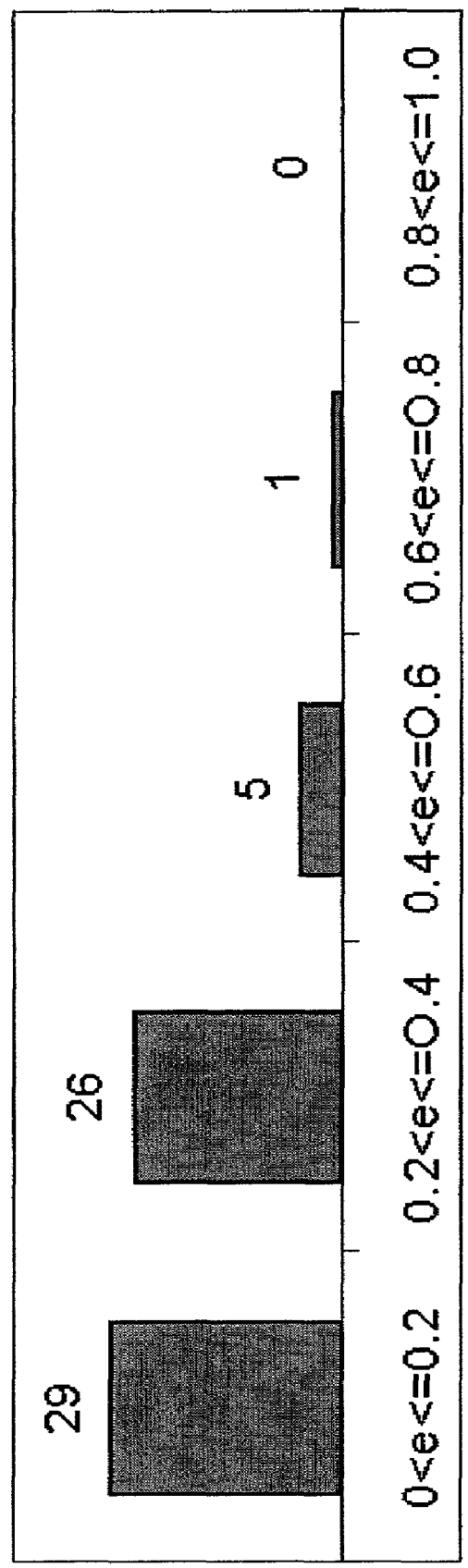
FIG. 23 shows a graph of the cone angle in degrees.
Figure 24:
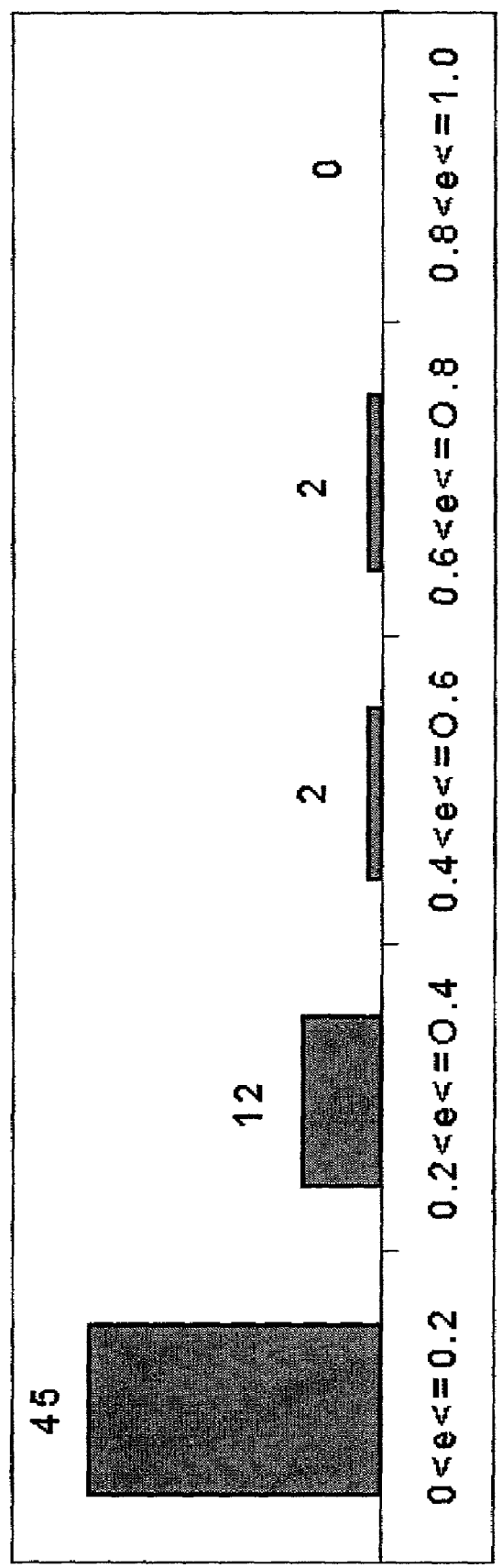
FIG. 24 shows a graph of the roll angle error in degrees.
Figure 25:
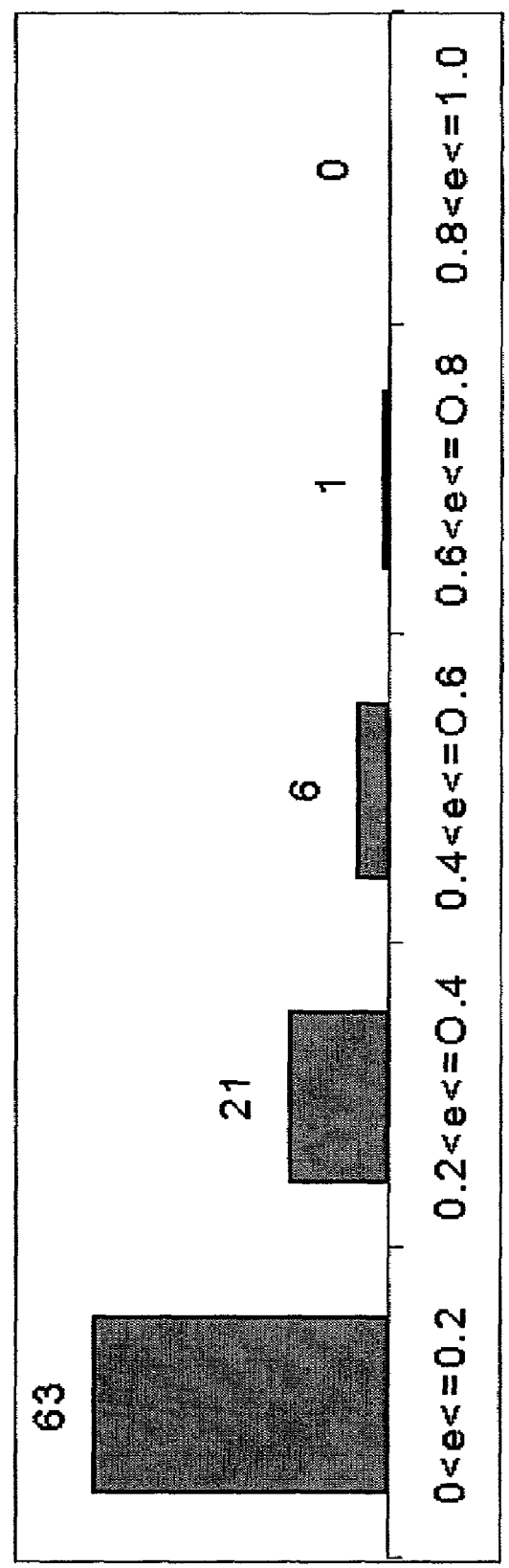
FIG. 25 shows a graph of the velocity error in percent.

During probe calculation, the probe is placed in a known flow field and a large set of calibration data containing the known velocity vector orientation and magnitude, and the 5 port pressures, is obtained for the desired range of Mach and Reynolds numbers, using a probe calibration setup. Then, in an actual flow-diagnostics experiment, the local flow variables (three velocity components, static and total pressure), Mach and Reynolds number) are calculated as follows: The 5 port pressures are recorded and the non-dimensional pressure coefficients b1 and b2 are calculated. This is b$\alpha$ and b$\beta$ for low-angle flow and b$\theta$ and b$\Phi$ for high-angle flow. The port with maximum pressure is detected and the corresponding low or high-angle calibration sector is determined. The calibration database is then searched, the calibration points associated with the particular sector are identified and the nth closest points to the test point (in terms of proximity in the (b1, b2) plane, as shown in FIG. 20) are retained. Each of the n selected calibration points is represented by a circle in FIG. 20, while the test point is represented by a star. The number n is user defined. Then, a least-squares interpolation is performed in order to determine the four flow variables, (At, A$\zeta$, $\alpha$, $\beta$) or (At, A$\zeta$, $\Phi$, $\theta$) for the test point.

Calibration points far from the tested point (in the b1–b2 plane) are assumed to have little or no influence on the calculation. Therefore, a local interpolation scheme is used and only calibration points close to the test point are used in the evaluation. A least-squares surface fit technique is used to calculate the two flow angles and the two pressures coefficients as functions of the independent input variables.

[Copy formulae]

The data reduction procedure described above is repeated for each separate test data point. A calibration algorithm has been developed to analyze the pressure data from a multi-hole probe and compare it to a calibration database obtained for a range of Mach and Reynolds numbers. The algorithm uses a local interpretation scheme based on least-squares surface fitting of the pressure coefficients and the recorded angles. The algorithm accounts for compressibility as well as Reynolds number effects and can therefore be applied to accurately reduce data from probes inserted into any subsonic flow field.

When calibrating multi-hole pressure probes a common practice is to record a separate test file with data points non-coincident with calibration data points. The pressures and the angles for the test file are recorded in the same sequence as the calibration data file such that it can be used as a verification of the quality of the calibration and reduction algorithm. Such verification files for the probe were reduced with the developed algorithm with excellent results. Typical error histograms are shown in FIGS. 21 through 25. The quality of the calibration and the data reduction is measured using the discrepancies between the angles and the velocity in the verification file and the predicted angles and velocity. These discrepancies will be referred to as the error (e) and are presented in the histograms below (FIGS. 21 to 25.) Each histogram bar represents the number of reduced test data points that has an absolute error within the range described on the x-axis. The pitch angle error had a mean absolute value 0.0643 degrees, an absolute maximum error of 0.2637 degrees and a standard deviation of 0.0606 degrees. The yaw angle error had a mean absolute value of 0.0646 degrees, an absolute maximum error of 0.2145 degrees and a standard deviation of 0.0513 degrees. The cone angle error had a mean absolute value of 0.2046 degrees, an absolute maximum error of 0.6137 degrees and a standard deviation of 0.1385 degrees. The roll angle error had a mean absolute value of 0.1323, an absolute maximum error of 0.6349 degrees and a standard deviation of 0.1531 degrees. The velocity error had an absolute maximum error of 0.6114% and a standard deviation of 0.2097%. Table 1 lists the standard deviations of the errors for each of the predicted flow variables.

Unsteady Probe Calibration

From the previous state-of-the-art, it was obvious that there was an important need to develop unsteady probe calibration theory and techniques in order to maintain high measurement accuracy in unsteady flows. The inertial effects come from the probe-fluid interaction in an accelerated flowfield. If a sphere is translating in steady motion through an inviscid fluid at rest the drag is zero (d'Alembert's paradox). The absence of drag is due to the equal and opposite pressure forces on the windward and the leeward side of the sphere. This result is naturally not observed in experiments due to the viscous effects that are particularly dominant on the leeward side of the sphere. For the same sphere in accelerated translation through a fluid at rest, the pressures on the windward and leeward sides no longer balance and there is a resulting force acting the in the direction opposite to that of the acceleration. The implications of this phenomenon for a multi-hole probe in an unsteady (accelerated) flowfield is that the measured pressure on the surface of the probe no longer depends on the rate of change of the velocity of the fluid. We have developed the techniques to quantify and then correct these inertial effects such that a spherical multi-hole probe can be successfully used in unsteady flowfields.

Figure 26:
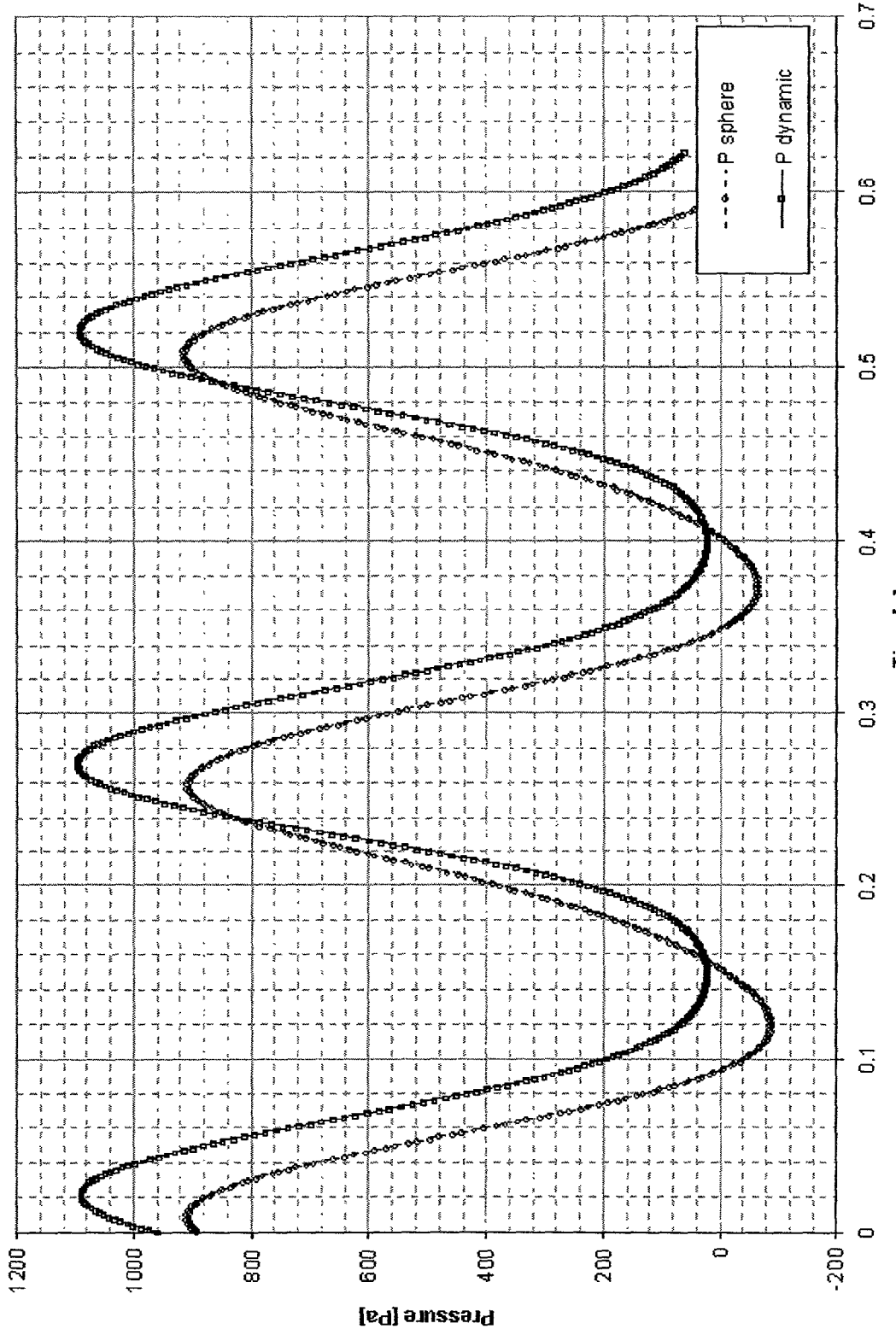
FIG. 26 shows a plot of the sphere pressure and true probe relative dynamic pressure of an oscillating flow.
Figure 27:
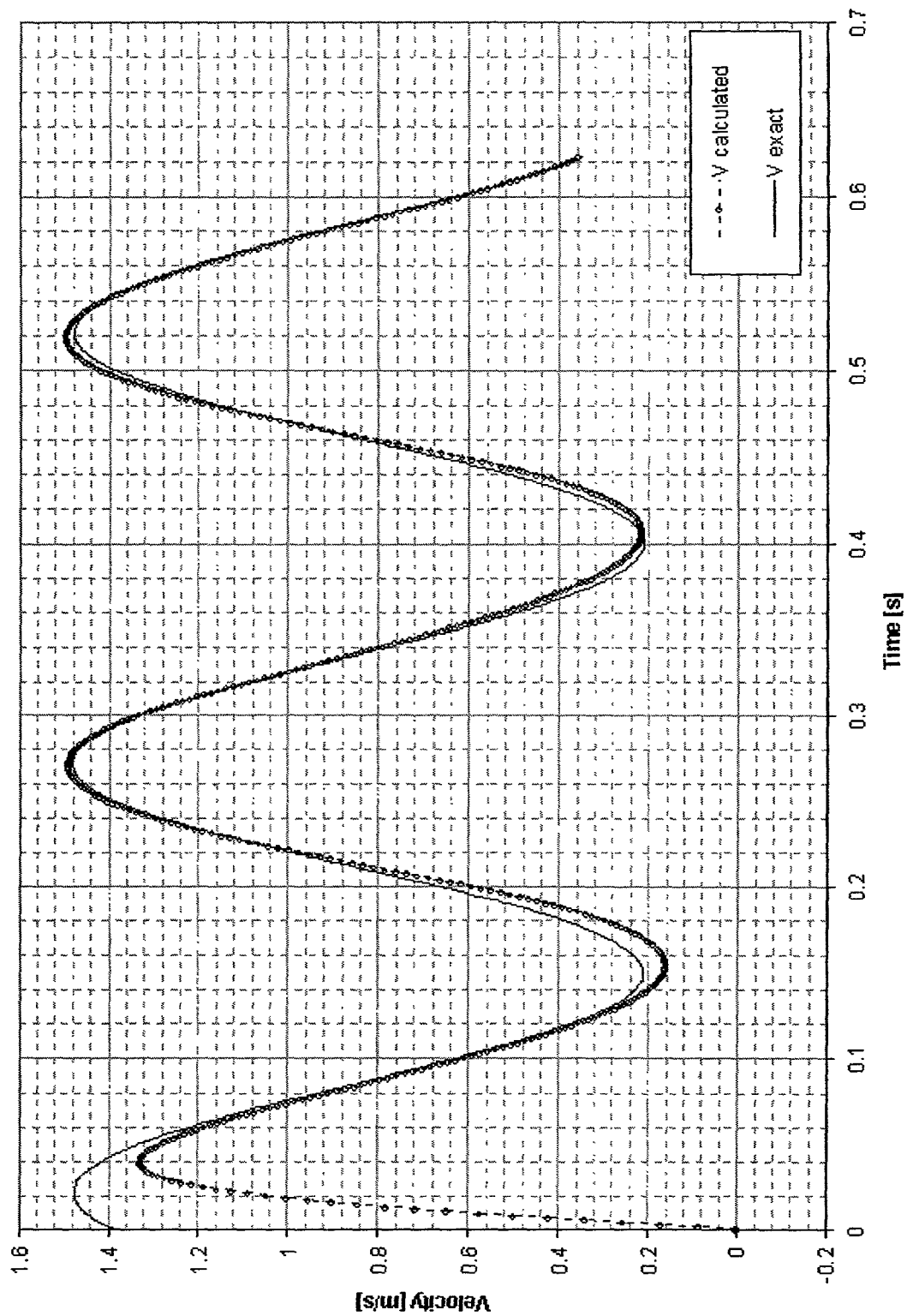
FIG. 27 shows a plot of the exact and predicted velocity for the flowfield corresponding to FIG. 26.
Figure 26:
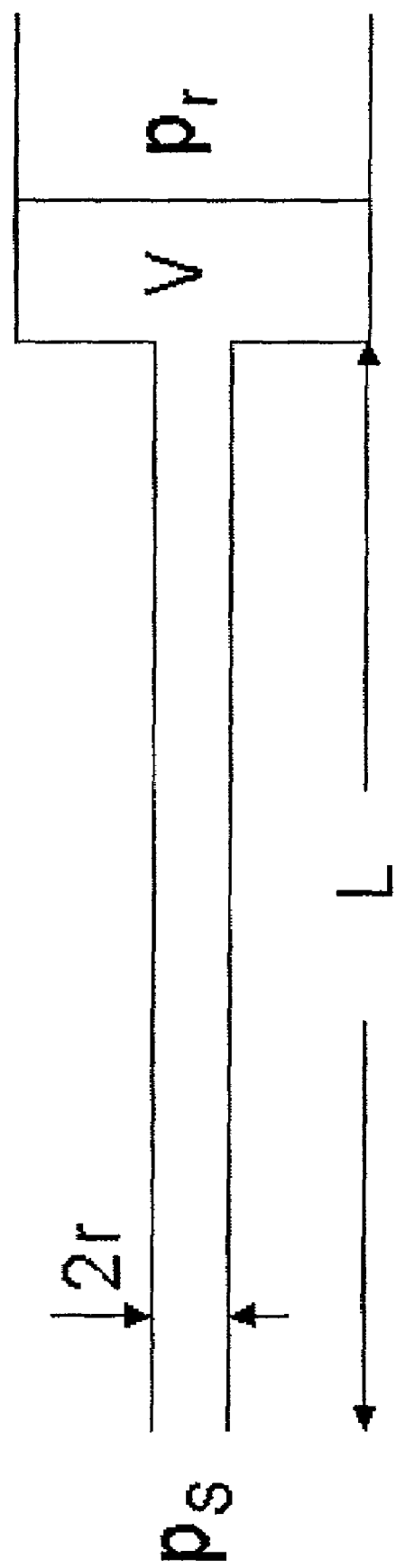
Figure 30:
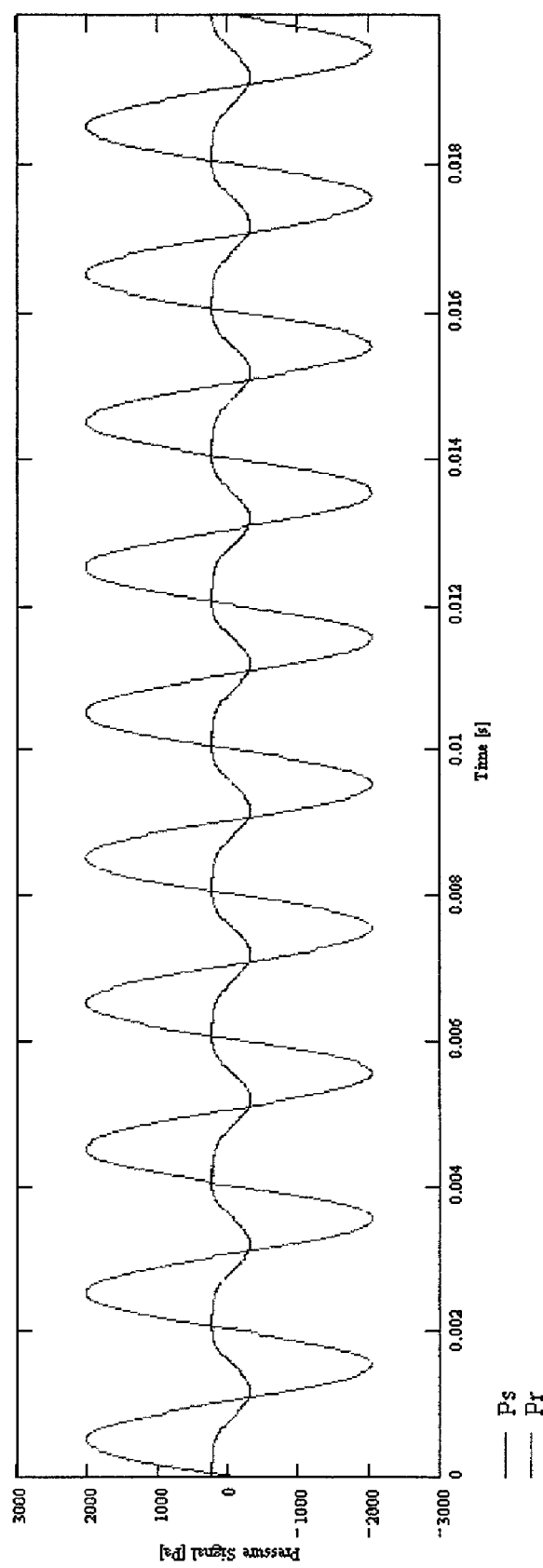
FIG. 30 shows a plot of the pressure signal with true signal and recorded signal.
Figure 32:
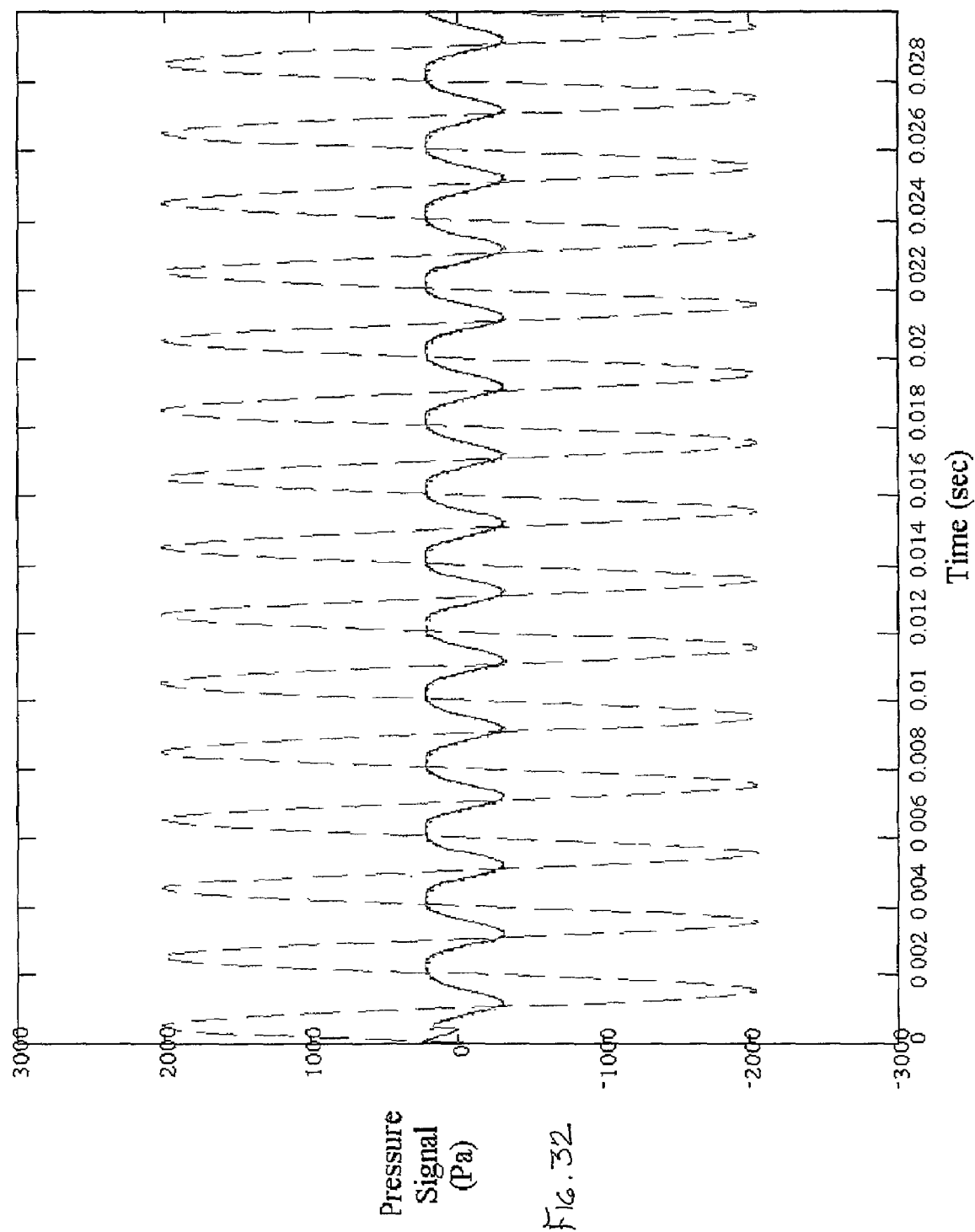
FIG. 32 shows a plot of the reconstructed signal for the Example 1 shown in FIG. 31.
Figure 33:
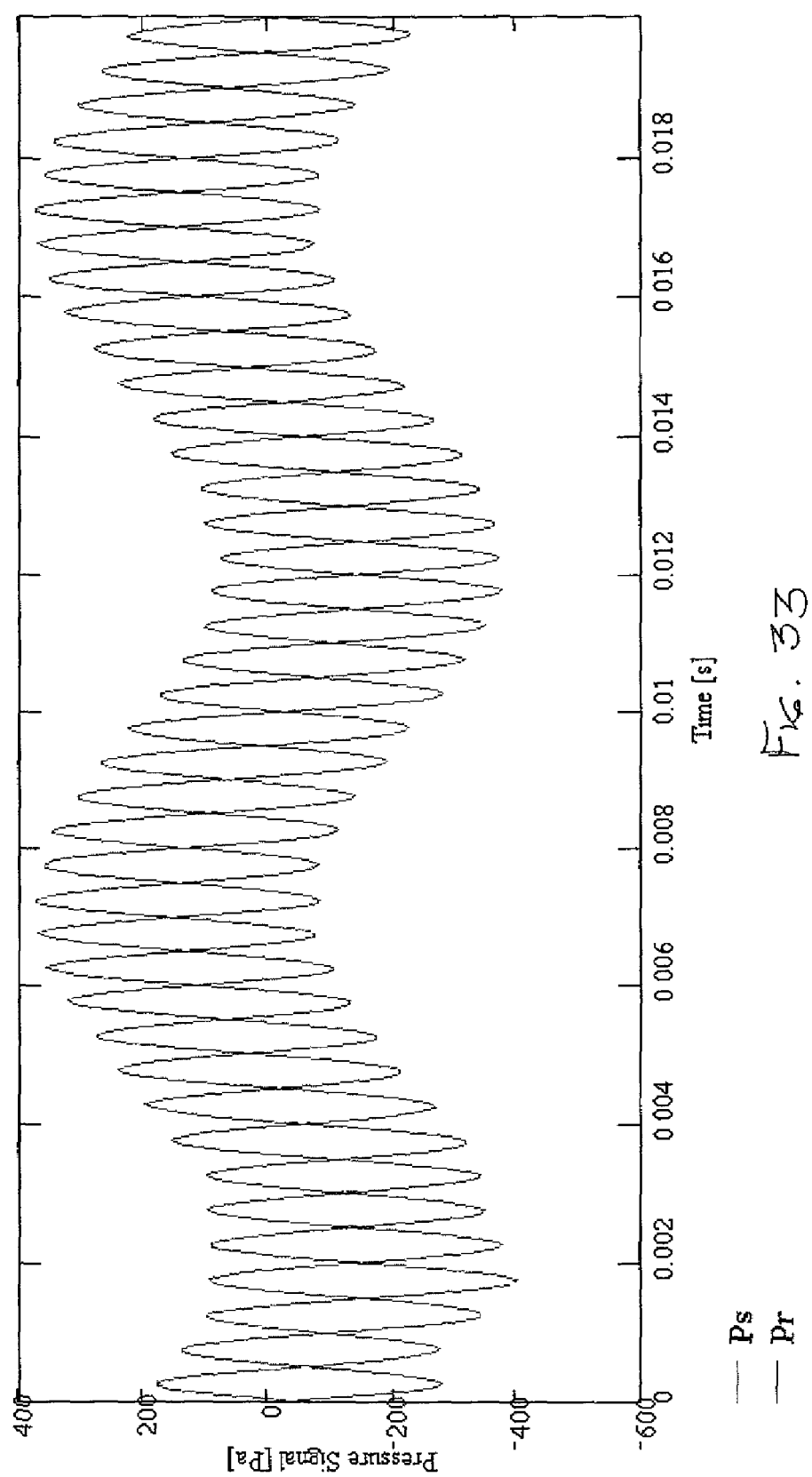
FIG. 33 shows the plot of a pressure signal with massive phase shifts shown.
Figure 34:
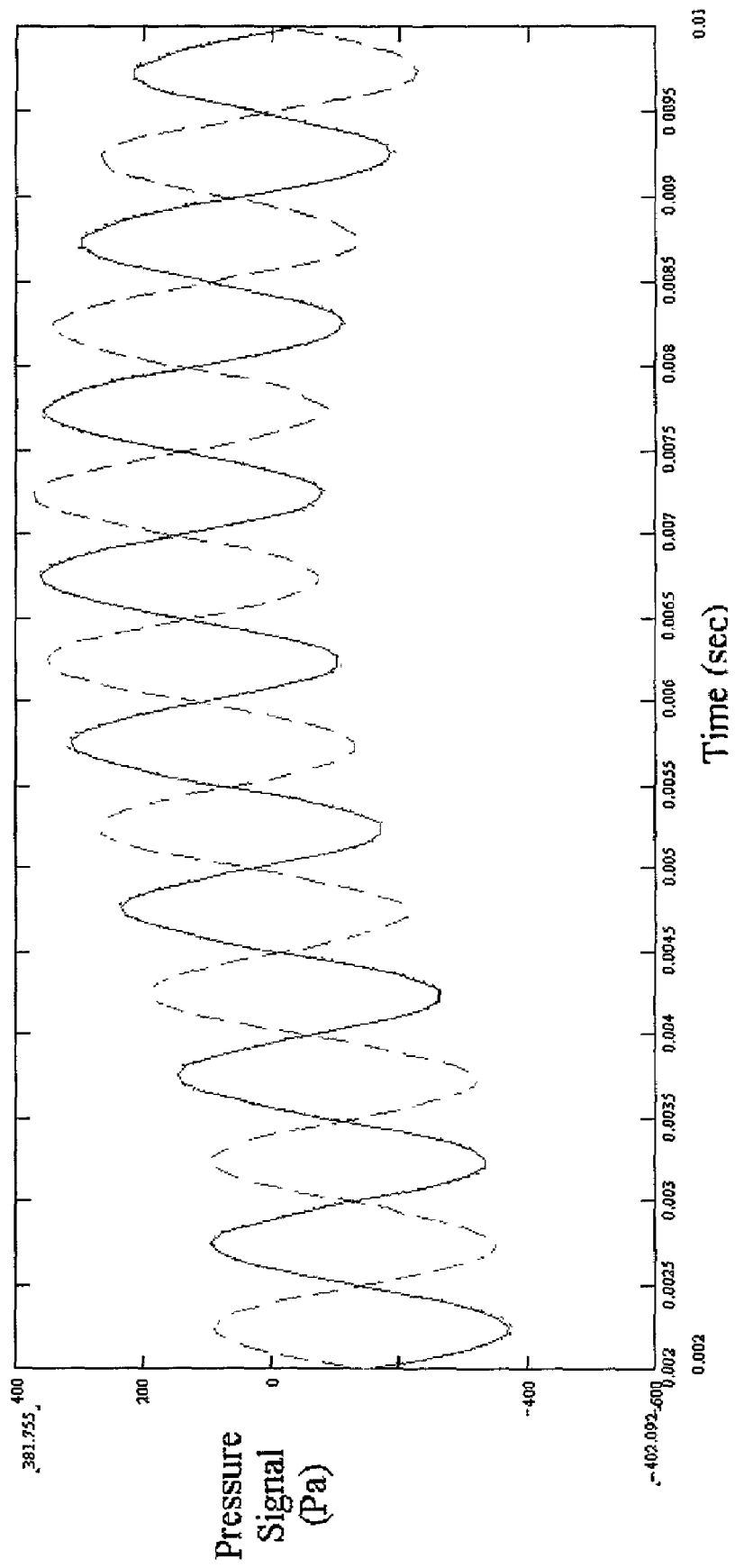
FIG. 34 is a plot of the reconstructed signal for Example 2 shown in FIG. 33.
Figure 35:
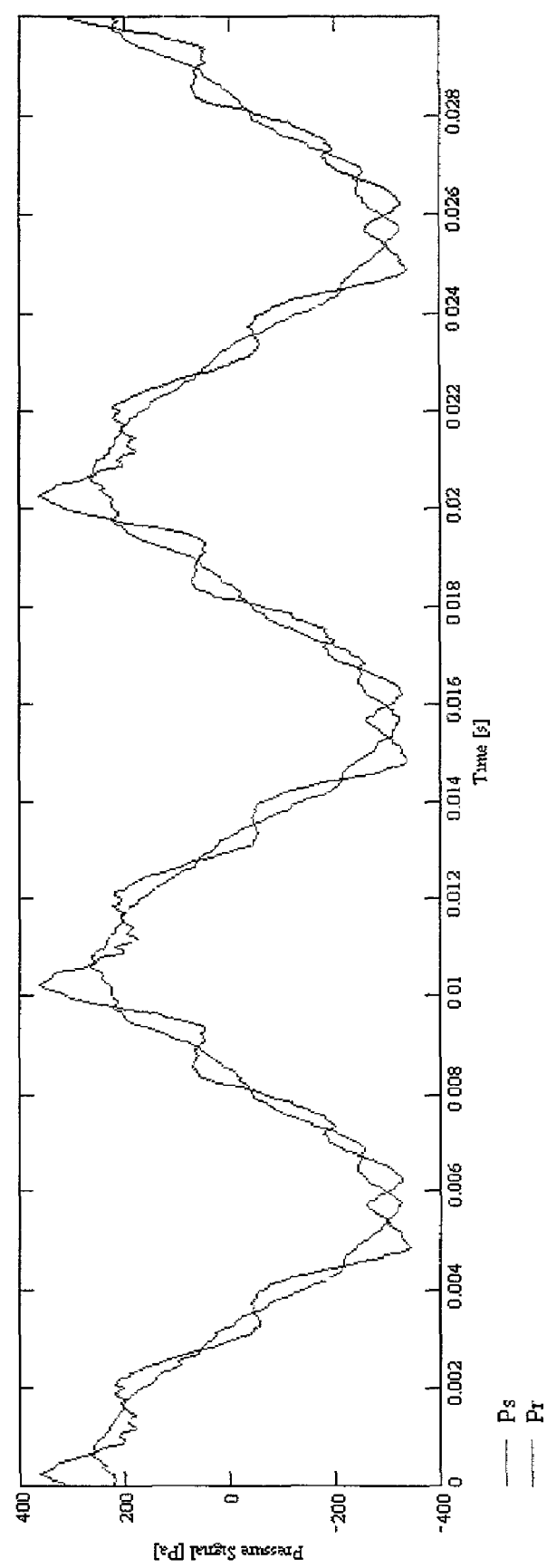
FIG. 35 shows the plot of the pressure signal at 25% amplitude with the true signal and the recorded signal.
Figure 36:
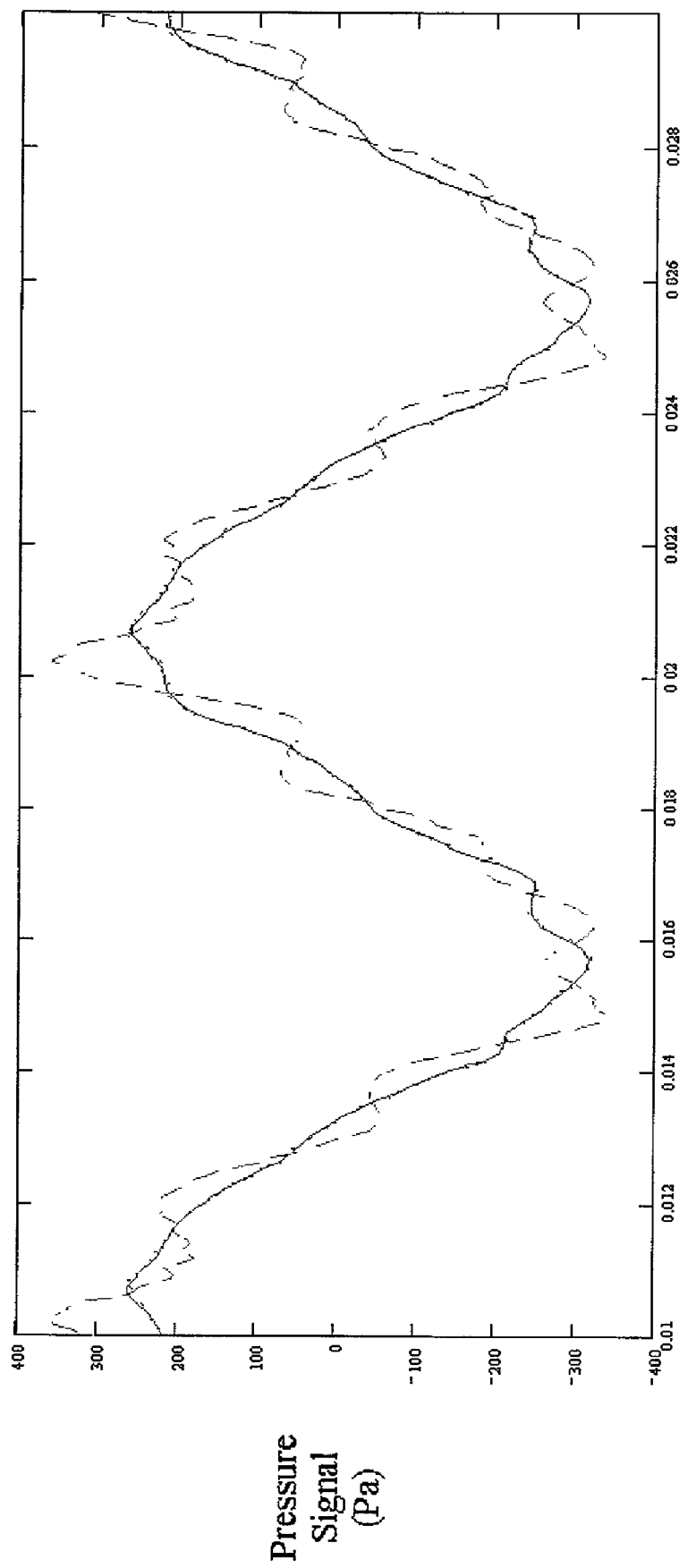
FIG. 36 shows the reconstructed signal for the Example 3 shown in FIG. 35.
Figure 37:
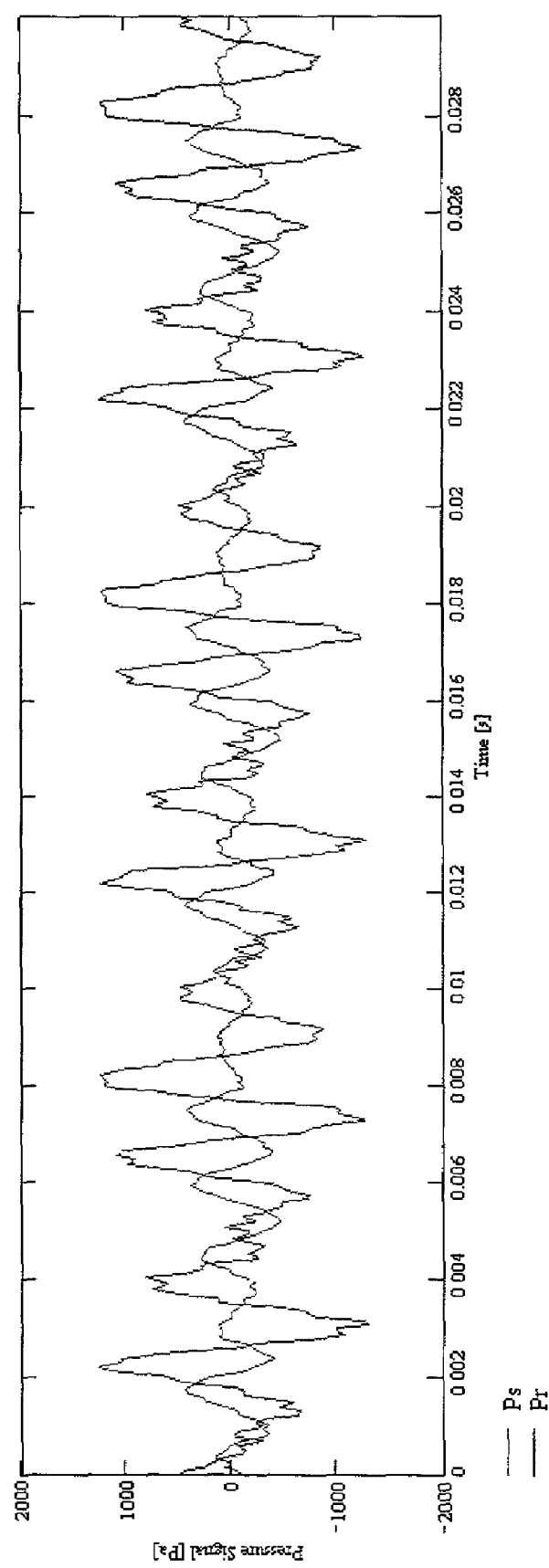
FIG. 37 shows the pressure signal at 100% amplitude.
Figure 38:
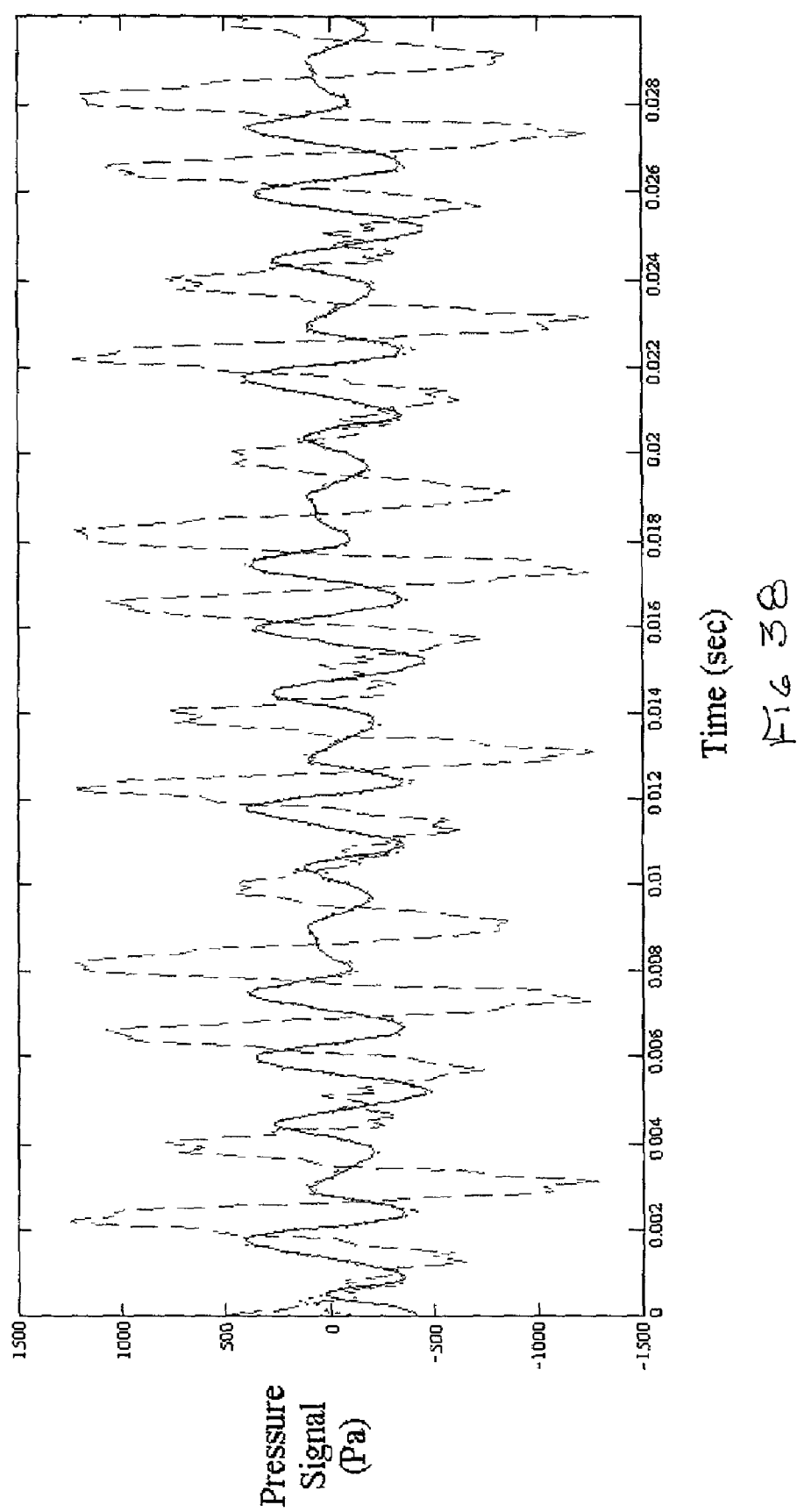
FIG. 38 shows the plot of the reconstructed signal of Example 4 of FIG. 37.

For an unsteady oscillating flowfield, FIG. 26 shows the discrepancy between the actual flow pressure (labeled p_dynamic) and the pressure that the spherical probe would measure if only steady state calibration techniques are used (labeled p_sphere). Obviously, the error is very large. The unsteady calibration techniques are correcting for this discrepancy. FIG. 27 shows the comparison between the exact flow velocity corresponding to the flow of FIG. 26 and the velocity predicted by the probe, after both steady and unsteady flow effects have been taken into account. As one can see the agreement is very good. The differences seen in the first half cycle are a numerical artifact which usually results in the first half being left out.

FIG. 28 shows the schematic of a basic tubing transducer system with a pressure measuring transducer connected to a tubing system of length L and diameter 2r. The true pressure ps(t) is the instantaneous true pressure at the measuring point (probe tip), while the measured pressure pr(t) will be generally be distorted in amplitude and phase. The question then is very simple as to how can one reconstruct the true instantaneous pressure px(t) at the probe tip by measuring pr(t)?

The software has been developed to accomplish reconstructing the instantaneous pressure ps(t). Although the discussion herein is restricted, for illustration purposes, to the simple system of FIG. 28, the technique is equally applicable to more elaborate tubing systems consisting of multiple tubes of different lengths and diameters. First the frequency response curves (amplitude and phase) of the tubing system are obtained in a proprietary experimental facility and the results check against theory. Once these are known, a numerical algorithm uses these response curves to reconstruct the true pressure signal from the measured signal. Below, we present examples of the reconstruction algorithm performance. FIG. 29 represents the gain and phase angle curves for a 6" long, 0.077" ID tube. This tube system was used to test the reconstruction algorithm. For that, several different pressure signals were applied, at various frequencies and amplitudes. For each test, the applied, recorded and reconstructed signals are as the FIGS. 30 through 38.

Having described the invention and its embodiments it will be obvious to those of ordinary skill in the art that many changes and modifications may be made without departing from the scope of the appended claims.

The invention claimed is:

1. A high performance, fast-response, multi-sensor pressure probe for measuring velocity and pressure measurements, said probe comprising
    a spherical non-solid probe tip,
    a plurality of holes in said probe tip,
    a plurality of pressure transducers embedded in said holes adjacent the end of the tip,
    a plurality of sensors embedded in said tip adjacent said transducers, so as to give an instantaneous response and high performance due to elimination of lag time between the sensor reading and the transducer response due to the close proximity between the transducers and sensors.

2. A probe as in claim 1 wherein there are five sensors and five transducers in said tip.

3. A probe as in claim 1 wherein there are seven sensors and seven transducers in said tip.

4. A probe as in claim 1 wherein said probe tip is spherical and there are holes all around the sphere with sensors therein so that said probe is omni-directional.

5. A probe as in claim 1 wherein said sensors have a high frequency response and are located in holes adjacent the tip of the probe so as to minimize hole channel length and thus the time lag induced by the volume from the probe surface to the sensor diaphragm as well as moving the Helmholtz resonance frequency well above the transducer frequency.

6. A probe as in claim 1 wherein the probe tip is 1.5 mm in diameter.

7. A probe as in claim 1 wherein the transducers are no more than 2 inches from the sensors.

8. A probe as in claim 1 wherein said tip is hemispherical and has five holes therein with five sensors mounted in said holes and having a frequency response of at least 20 kHz.

9. A probe as in claim 8 wherein the probe can operate at temperatures as high as 400 degrees Fahreheit.

10. A flow control multi-sensor probe for flow control experiments, said probe comprising,
    a probe body having a probe tip,
    holes in said probe tip,
    a number of sensors mounted in said holes in said tip,
    a corresponding number of pressure transducers with a range of plus or minus 2 PSIG installed in the probe body,
    said transducers being plus or minus 2 inches from said sensors.

11. A probe as in claim 10 having a self-contained computer, said computer adapted to gain voltage from the transducers and converts it to velocity components.

12. A multi-hole probe for measuring flow velocity, said probe comprising,
    a probe tip,
    holes in said probe tip,
    a plurality of pressure sensors located in said tip in the immediate vicinity of said holes and in communication with said holes so that said sensors produce an almost instantaneous reading of the pressure in said holes from said flow, and wherein said holes constitute a MEMS sensor array and said sensors including bossed diaphragm structures for improved sensitivity.

* * * * *